United States Patent
Harada

(10) Patent No.: US 10,641,784 B2
(45) Date of Patent: May 5, 2020

(54) DETECTION DEVICE

(71) Applicant: DENSO CORPORATION, Kariya, Aichi-pref. (JP)

(72) Inventor: Yasuhiro Harada, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 140 days.

(21) Appl. No.: 15/757,508

(22) PCT Filed: Jul. 1, 2016

(86) PCT No.: PCT/JP2016/069588
§ 371 (c)(1),
(2) Date: Mar. 5, 2018

(87) PCT Pub. No.: WO2017/043160
PCT Pub. Date: Mar. 16, 2017

(65) Prior Publication Data
US 2018/0245949 A1      Aug. 30, 2018

(30) Foreign Application Priority Data

Sep. 7, 2015   (JP) .................. 2015-175738

(51) Int. Cl.
| | |
|---|---|
| *G01P 1/02* | (2006.01) |
| *G01D 5/245* | (2006.01) |
| *G01D 11/24* | (2006.01) |
| *G01D 11/30* | (2006.01) |
| *G01P 3/487* | (2006.01) |

(52) U.S. Cl.
CPC .............. *G01P 1/026* (2013.01); *G01D 5/245* (2013.01); *G01D 11/245* (2013.01); *G01D 11/30* (2013.01); *G01P 1/02* (2013.01); *B60T 2240/03* (2013.01); *G01P 3/487* (2013.01)

(58) Field of Classification Search
CPC . G01P 1/02; G01P 1/026; G01P 3/487; G01D 5/245; G01D 11/245; G01D 11/30; B60T 2240/03
See application file for complete search history.

(56) References Cited

U.S. PATENT DOCUMENTS

| | | | | |
|---|---|---|---|---|
| 7,305,765 | B2 * | 12/2007 | Mitsue | ...................... B23B 5/02 29/894.362 |
| 2003/0193328 | A1 * | 10/2003 | Iwashita | ................ G01D 5/147 324/207.2 |
| 2005/0007098 | A1 | 1/2005 | Harada | |
| 2006/0016274 | A1 | 1/2006 | Hattori et al. | |
| 2007/0085644 | A1 * | 4/2007 | Asaka | ...................... B22F 7/08 335/251 |

FOREIGN PATENT DOCUMENTS

| | | |
|---|---|---|
| CN | 2901612 Y | 5/2007 |
| JP | 2006-030075 A | 2/2006 |
| JP | 4179083 B2 | 11/2008 |

* cited by examiner

*Primary Examiner* — Amy He
(74) *Attorney, Agent, or Firm* — Knobbe, Martens, Olson & Bear, LLP

(57) ABSTRACT

A wheel speed detection device includes a detection element, a base member, and an affixing member. The detection element has a main body, leads, and protruding from the main body. The affixing member affixes the detection element to the base member by pressing the leads and against the base member without pressing the main body against the base member.

9 Claims, 27 Drawing Sheets

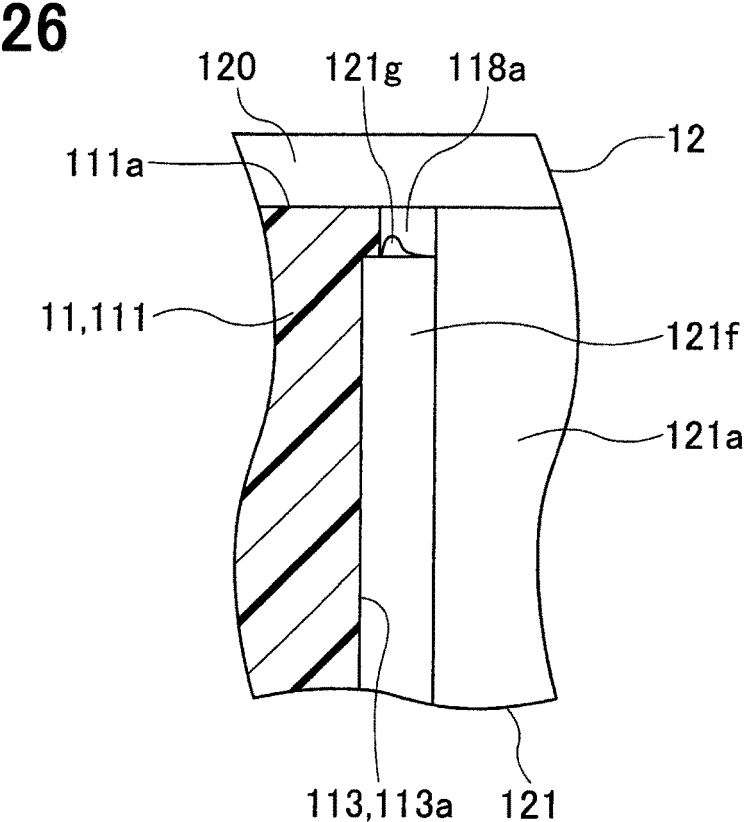
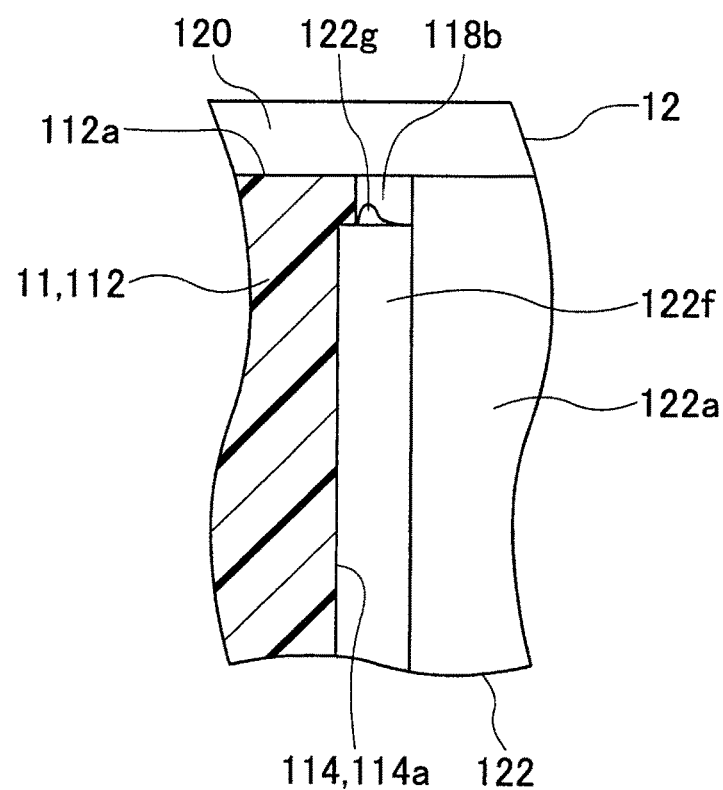

DETECTION DEVICE

CROSS REFERENCE TO RELATED APPLICATION

The present application is based on Japanese Patent Applications No. 2015-175738 filed on Sep. 7, 2015 and No. 2016-26542 filed on Feb. 16, 2016, the disclosure of which is incorporated herein by reference.

TECHNICAL FIELD

The present disclosure relates to a detection device including a detection element, which has a main body and a lead protruding from the main body, and a base member to which the detection element is affixed.

BACKGROUND ART

A wheel speed sensor disclosed in, for example, Patent Literature 1 described below is an example of a detection device in the related art which includes a detection element, which has a main body and a lead protruding from the main body, and a base member to which the detection element is affixed.

The wheel speed sensor is a device installed to a vehicle to detect a rotation of a wheel. The wheel speed sensor includes a molded IC and a holding portion. The molded IC and the holding portion correspond to the detection element and the base member, respectively.

The molded IC is an element detecting a rotation. The molded IC has a main body and a lead. The main body is a substantially cuboidal portion formed by molding a rotation detection IC chip or the like with resin. The lead is a plate-shaped member to connect the IC chip or the like to an outside. The lead is provided to protrude from a side surface of the main body.

The holding portion is a member to which the molded IC is affixed. The holding portion is provided with a recess defined by a bottom surface and a side wall. The side wall has a rib-shaped portion for press-fit affixation.

The molded IC is affixed to the holding portion as follows. That is, the molded IC is moved in a direction perpendicular to the bottom surface of the holding portion first until the molded IC comes in close proximity to the bottom surface. The molded IC is then moved in a direction horizontal to the bottom surface of the holding portion until the main body of the molded IC is press-fitted into the recess defined by the bottom surface and the side wall.

PRIOR ART LITERATURES

Patent Literature

Patent Literature 1: Japanese Patent No. 4179083

In the wheel speed sensor described above, the main body of the molded IC is press-fitted into the recess defined by the bottom surface and the side wall of the holding portion. Hence, a load caused by press-fitting may be applied to the IC chip or the like in the main body, and a detection result may vary under influence of the applied load.

In addition, in the case of the wheel speed sensor described above, the molded IC is affixed to the holding portion by moving the molded IC first perpendicularly and then horizontally with respect to the bottom surface of the holding portion. That is, the molded IC has to be moved in two directions. Interference with peripheral components needs to be taken into consideration when the molded IC is moved in a horizontal direction. A facility configuration may thus become complex and hence a facility cost may be increased.

SUMMARY OF INVENTION

It is an object of the present disclosure to produce a detection device capable of restricting application of a load to a main body and allowing a detection element to be affixed to a base member by a single-direction moving operation.

According to one aspect of the present disclosure, a detection device comprises a detection element having a main body and a lead protruding from the main body. The detection device further comprises a base member to which the detection element is affixed. The detection device further comprises an affixing member affixed to the base member. The affixing member affixes the detection element to the base member by pressing the lead against the base member without pressing the main body against the base member.

BRIEF DESCRIPTION OF THE DRAWINGS

The above and other objects, configurations, and advantages of the present disclosure will become more apparent from the following detailed description taken in conjunction with the accompanying drawings, in which:

FIG. 26 is a first explanatory view used to describe a relationship between an excess portion and the clearance portion;

FIG. 27 is a second explanatory view used to describe a relationship between an excess portion and the clearance portion;

DESCRIPTION OF EMBODIMENTS

Figure 1:
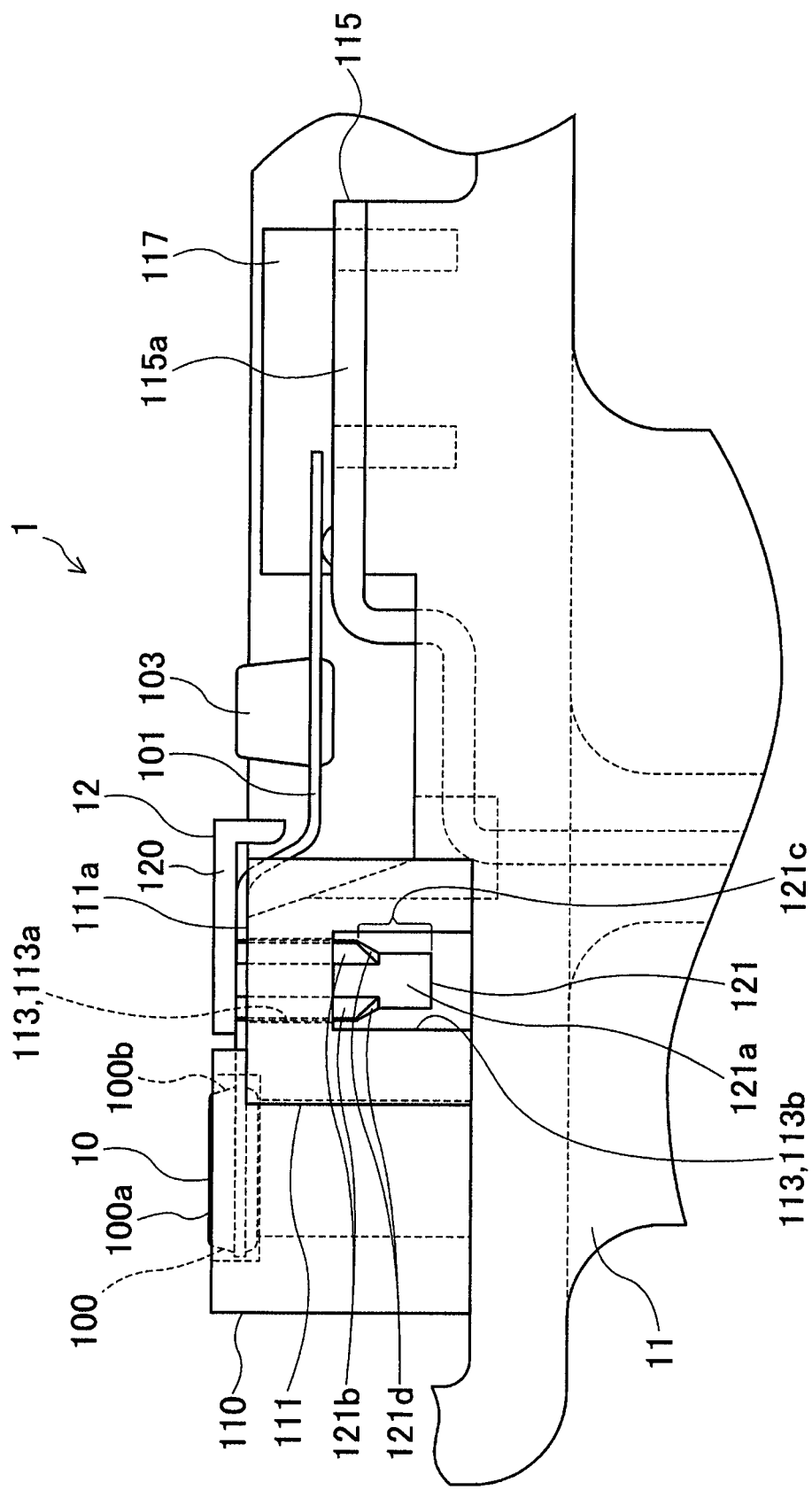
FIG. 1 is a partial side view showing a periphery of a detection element in a wheel speed detection device of a first embodiment.
Figure 2:
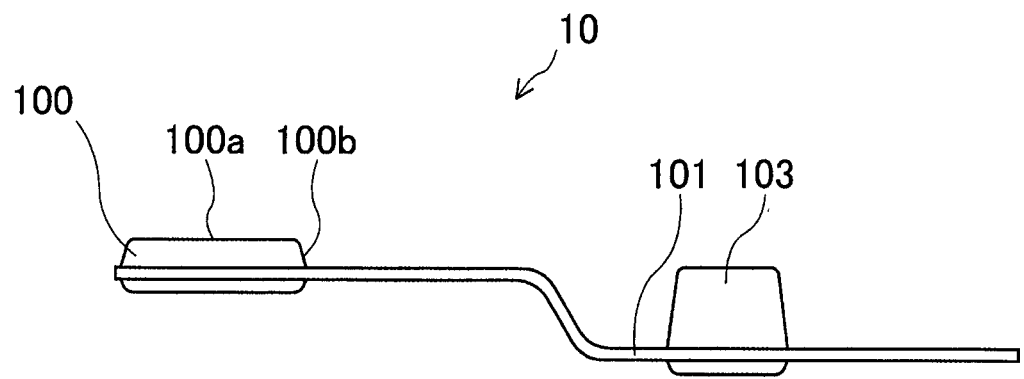
FIG. 2 is a side view showing the detection element of FIG. 1.
Figure 3:
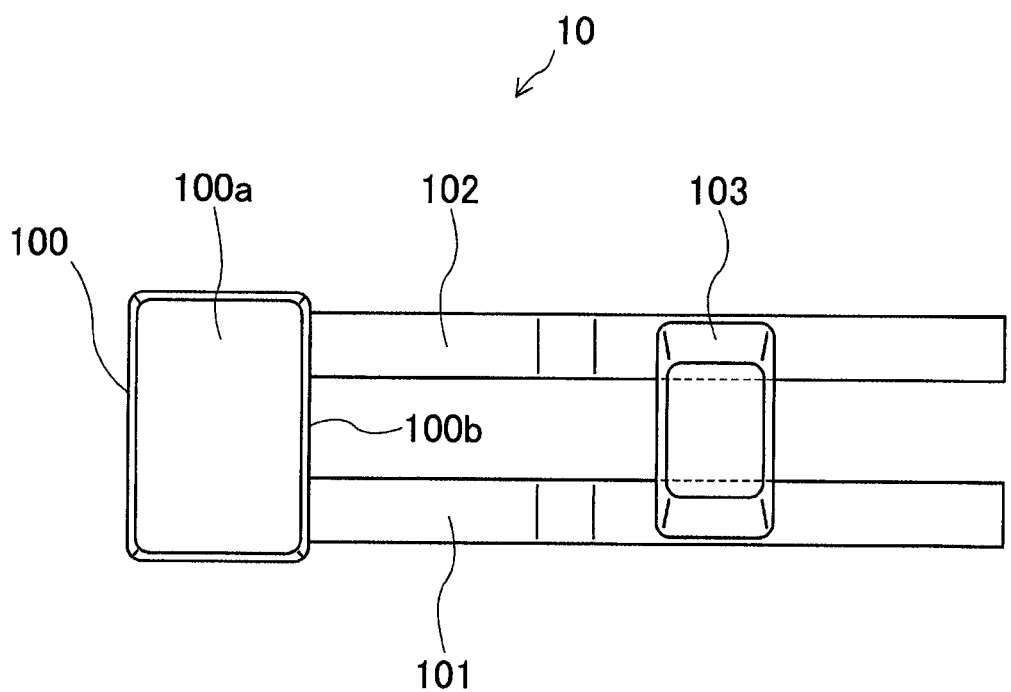
FIG. 3 is a top view showing the detection element of FIG. 1.
Figure 4:
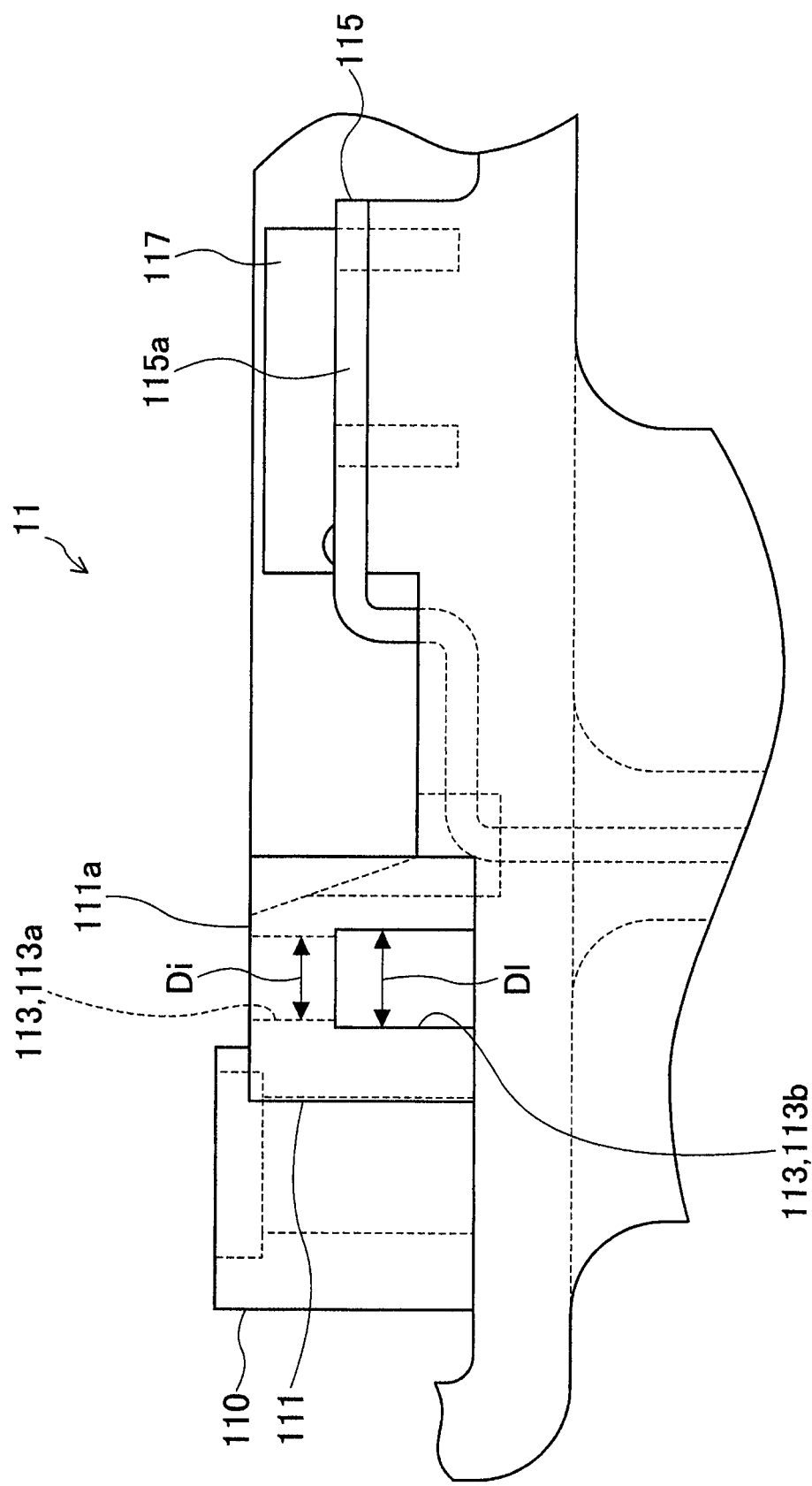
FIG. 4 is a side view showing a base member of FIG. 1.
Figure 5:
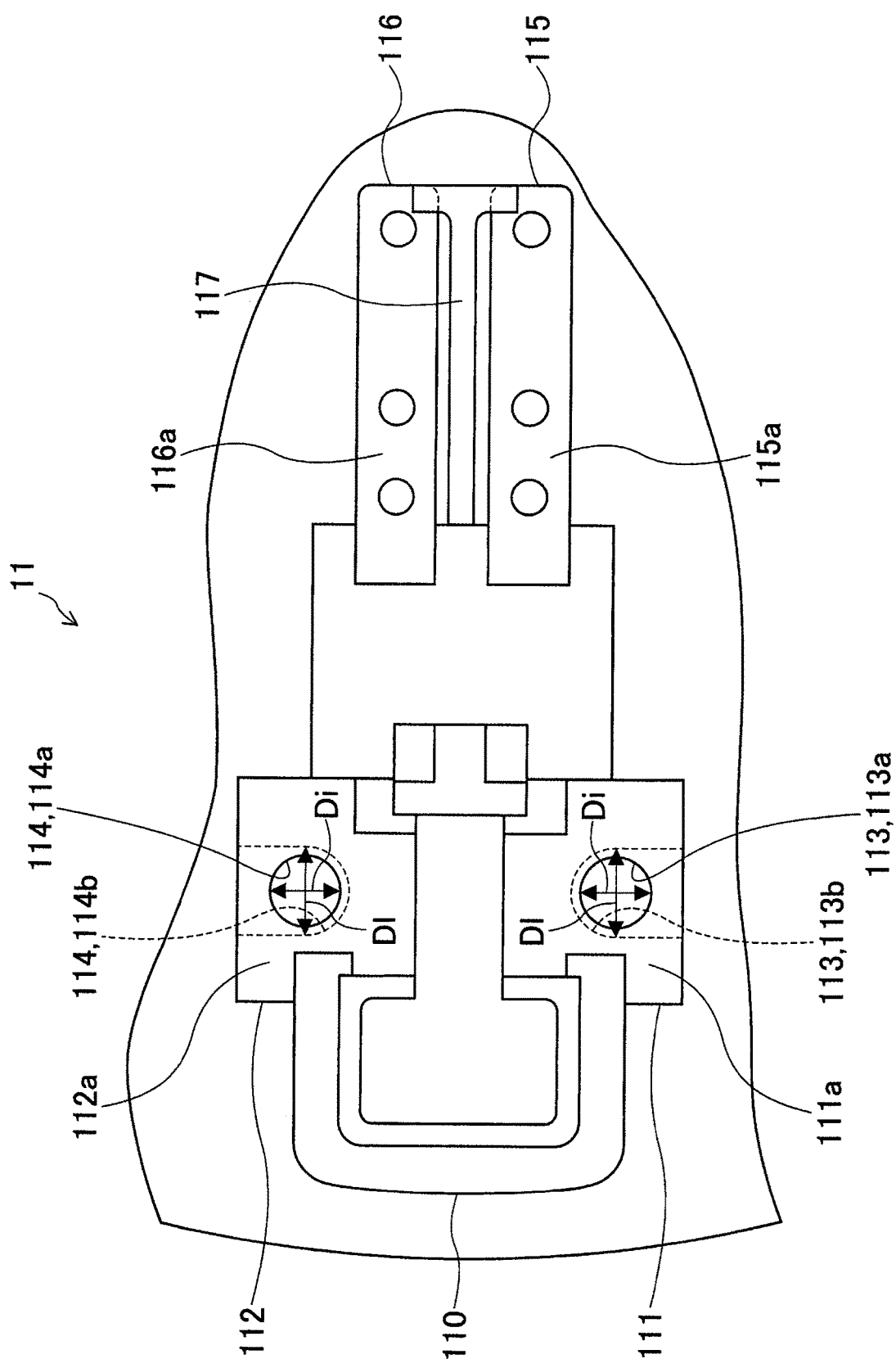
FIG. 5 is a top view showing the base member of FIG. 1.

The present disclosure will be described in detail in embodiments below. The embodiments will describe an example where a detection device of the present disclosure is applied to a wheel speed detection device installed to a vehicle to detect a rotation of a wheel.

Ribs 121b and 122b protrude from outer peripheral surfaces of column portions 121a and 122a to an opposite side to a shaft center side, respectively. The ribs 121b and 122b are portions extending in an axial direction of the column portions 121a and 122a, the ribs 121b and 122b being fitted to hole portions 113 and 114, respectively, with interference partially in the axial direction at tip ends protruding to an opposite side to the shaft center side. To be more specific, portions of the ribs 121b and 122b inserted, respectively, into interference fit portions 113a and 114a are fitted with interference. In addition, portions of the ribs 121b and 122b inserted, respectively, into clearance fit portions 113b and 114b are fitted with clearance. Three ribs 121b and three ribs 122b are provided to the outer peripheral surfaces of the column portions 121a and 122a, respectively, at regular intervals in a circumferential direction. The ribs 121b and 122b are provided to the outer peripheral surfaces of the column portions 121a and 122a, respectively, to extend in the axial direction from ends of the column portions 121a and 122a, respectively, on a side of a pressing portion 120 to points slightly short of the tip ends. Further, taper portions 121d and 122d inclined to the shaft center side toward the tip ends of the column portions 121a and 122a, respectively, are provided to a tip end side of the column portions 121a and 122a, respectively. The ribs 121b and 122b are set in such a manner that circles formed by radial tip ends of the ribs 121b and 122b have a diameter of Dr.

An effect of a wheel speed detection device of a first embodiment will now be described.

According to the first embodiment, a wheel speed detection device 1 includes a detection element 10, a base member 11, and an affixing member 12. The detection element 10 is an element detecting a rotation speed according to a magnetic variance, and has a main body 100 and leads 101 and 102 protruding from the main body 100. The base member 11 is a member to which the detection element 10 is affixed. The affixing member 12 is affixed to the base member 11. The affixing member 12 is a member affixing the detection element 10 to the base member 11 by pressing the leads 101 and 102 against the base member 11. The affixing member 12 presses the leads 101 and 102 against the base member 11 without pressing the main body 100 against the base member 11. The detection element 10 is thus affixed to the base member 11 by the affixing member 12. Consequently, a load applied to the main body 100 can be reduced to a reasonable extent or to zero. After the detection element 10 is mounted to the base member 11, the affixing member 12 only has to be affixed to the base member 11 to press the leads 101 and 102 against the base member 11. That is, it is not necessary to move the detection element 10 in a horizontal direction. Hence, the detection element 10 can be affixed to the base member 11 by a single-direction moving operation. Consequently, a facility configuration can be simpler and a facility cost can be reduced.

According to the first embodiment, the base member 11 has the hole portions 113 and 114. The affixing member 12 has the pressing portion 120 and shaft portions 121 and 122. The pressing portion 120 is a portion which presses the leads 101 and 102 against the base member 11 without pressing the main body 100 against the base member 11. The shaft portions 121 and 122 are portions protruding from the pressing portion 120. The shaft portions 121 and 122 are partially fitted, respectively, to the hole portions 113 and 114 with interference when inserted into the hole portions 113 and 114, respectively. Accordingly, the affixing member 12 can be affixed to the base member 11 in a reliable manner by inserting the shaft portions 121 and 122 into the hole portions 113 and 114, respectively, and allowing parts of the shaft portions 121 and 122 to be fitted, respectively, to the hole portions 113 and 114 with interference. Hence, the leads 101 and 102 can be pressed against the base member 11 in a reliable manner by the pressing portion 120. Consequently, the detection element 10 can be securely affixed to the base member 11.

According to the first embodiment, the pressing portion 120 presses predetermined regions of the respective leads 101 and 102, which are close to the main body 100, against the base member 11. Hence, displacement of the main body 100 due to vibrations or the like can be restricted in a reliable manner.

According to the first embodiment, the shaft portions 121 and 122 have the column portions 121a and 122a and the ribs 121b and 122b, respectively. The column portions 121a and 122a are portions protruding from the pressing portion 120. The ribs 121b and 122b protrude from the outer peripheral surfaces of the column portions 121a and 122a, respectively, to an opposite side to the shaft center side. The ribs 121b and 122b extend in the axial direction of the column portions 121a and 122a, respectively. The ribs 121b and 122b are fitted, respectively, to the hole portions 113 and 114 with interference partially in the axial direction at tip ends, which protrude to the opposite side to the shaft center side. Hence, when the shaft portions 121 and 122 are inserted into the hole portions 113 and 114, respectively, only the radial tip ends of the ribs 121b and 112b are fitted, respectively, to the hole portions 113 and 114 with interference. Accordingly, in comparison with a case where no ribs are provided and an outer peripheral surface of a shaft portion is fitted to a hole portion with interference along an entire circumference, an insertion load can be reduced.

According to the first embodiment, the hole portions 113 and 114 have the interference fit portions 113a and 114a and the clearance fit portions 113b and 114b, respectively. The interference fit portions 113a and 114a are portions, which are provided to a shaft portion inserted side and fitted, respectively, to the shaft portions 121 and 122 with interference. The clearance fit portions 113b and 114b are portions, which are provided adjacent to the interference fit portions 113a and 114a, respectively, on an opposite side to the shaft portion inserted side, and fitted, respectively, to the shaft portions 121 and 122 with clearance. Hence, when the shaft portions 121 and 122 are inserted into the hole portions 113 and 114, respectively, step portions 121e and 122e are formed at boundaries, respectively, between the shaft portion 121 located in the interference fit portion 113a and the shaft portion 121 located in the clearance fit portion 113b and between the shaft portion 122 located in the interference fit portion 114a and the shaft portion 122 located in the clearance fit portion 114b. The step portions 121e and 122e engage, respectively, with step portions 113c and 114c formed at boundaries between the interference fit portions 113a and 114a and the clearance fit portions 113b and 114b, respectively. The affixing member 12 can be thus prevented from falling off.

According to the first embodiment, the shaft portions 121 and 122 respectively have convergent portions 121c and 122c provided to tip end portions and tapered toward the tip ends. Hence, the convergent portions 121c and 122c function as guides and the shaft portions 121 and 122 can be readily inserted into the hole portions 113 and 114, respectively. Assembling efficiency of the affixing member 12 can be thus enhanced.

The first embodiment has described an example where parts of the shaft portions 121 and 122 are fitted, respectively, to the hole portions 113 and 114 with interference. However, the present disclosure is not limited to the described example. An entire shaft portion may be fitted to a hole portion with interference. The shaft portion needs to be fitted to the hole portion with interference at least partially.

The first embodiment has described an example where two sets of a shaft portion and a hole portion in which to insert the shaft portion are provided. However, the present disclosure is not limited to the described example and one set or three or more sets of a shaft portion and a hole portion in which to insert the shaft portion may be provided.

The first embodiment has described an example where the shaft portions 121 and 122 and the hole portions 113 and 114 are provided to a region outside of the leads 101 and 102. However, the present disclosure is not limited to the described example. A shaft portion and a hole portion may be provided between the leads 101 and 102. For example, a shaft portion and a hole portion may be provided to press a lead against a base member without fail.

Figure 17:
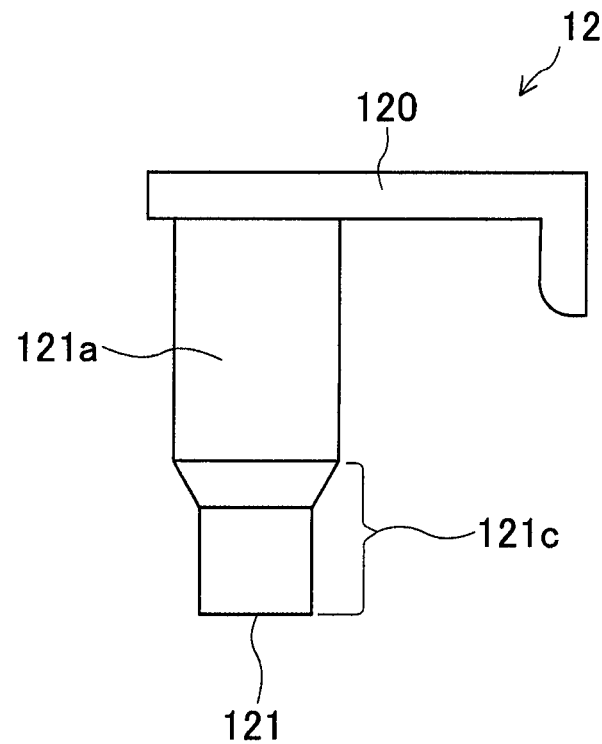
FIG. 17 is a side view showing an affixing member in a modification.

The first embodiment has described an example where three ribs 121b and three ribs 122b are provided to the shaft portions 121 and 122, respectively. However, the present disclosure is not limited to the described example. Two or four or more ribs may be provided to one shaft portion. Alternatively, as is shown in FIG. 17, it may be set in such a manner that an outer diameter of the column portion 121a is fitted to a hole portion with interference without providing ribs at all.

Figure 18:
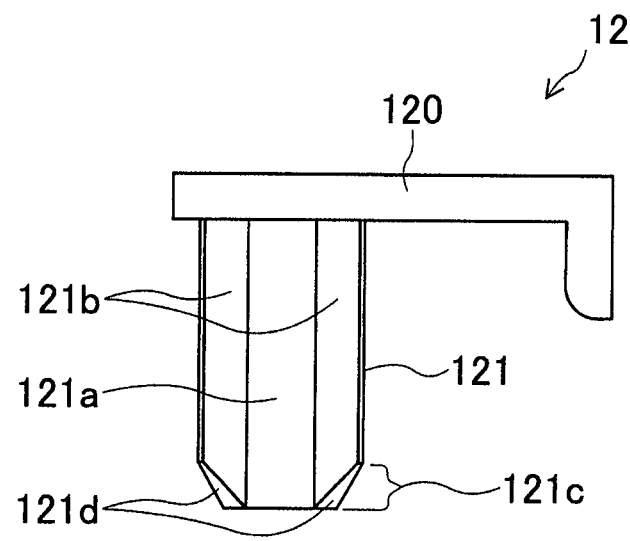
FIG. 18 is a side view showing an affixing member in another modification.

The first embodiment has described an example where the convergent portion 121c is formed of the taper portion 121d and the tip end of the column portion 121a. However, the present disclosure is not limited to the described example. As is shown in FIG. 18, the convergent portion 121c may be formed of the taper portion 121d and a tip end face of the column portion 121a.

The first embodiment has described an example where the shaft portions 121 and 122 are made of resin. However, the present disclosure is not limited to the described example. As another example, the shaft portions 121 and 122 may be made of a material allowing the shaft portions 121 and 122, which are once deformed by shrinking in diameter, to recover to original states by expanding in diameter when passed through the interference fit portions 113a and 114a, respectively, and mounted to the clearance fit portions 113b and 114b, respectively. The step portions 121e and 122e are formed at the boundaries, respectively, between the shaft portion 121, which is located in the interference fit portions 113a, and the shaft portion 121, which is located in the clearance fit portion 113b, and between the shaft portion 122, which is located in the interference fit portions 114a, and the shaft portion 122, which is located in the clearance fit portion 114b. The affixing member 12 can be thus prevented from falling off.

Second Embodiment

A wheel speed detection device of a second embodiment will now be described. The wheel speed detection device of the second embodiment is different from the wheel speed detection device of the first embodiment above in that a clearance portion is provided along an entire circumference between an outer peripheral surface of a shaft portion on a pressing portion side and an inner peripheral surface of a hole portion on a pressing portion side by changing a shape of an affixing member of the shaft portion.

The wheel speed detection device of the second embodiment is the same as the wheel speed detection device of the first embodiment above except for a shape of ribs of the shaft portion on the pressing portion side. Hence, components other than the ribs will not be described herein. A configuration of the affixing member of the second embodiment will be described first with reference to FIG. 19 to FIG. 21.

Figure 19:
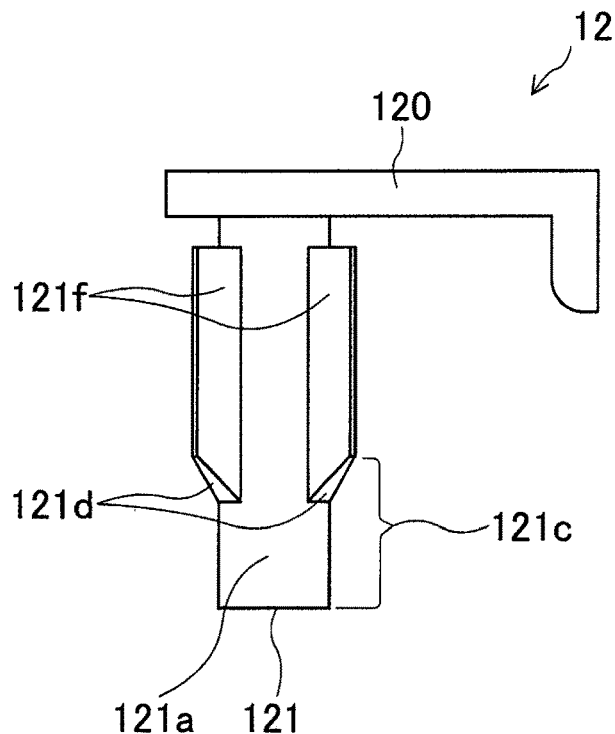
FIG. 19 is a side view showing one side of an affixing member of a second embodiment.
Figure 20:
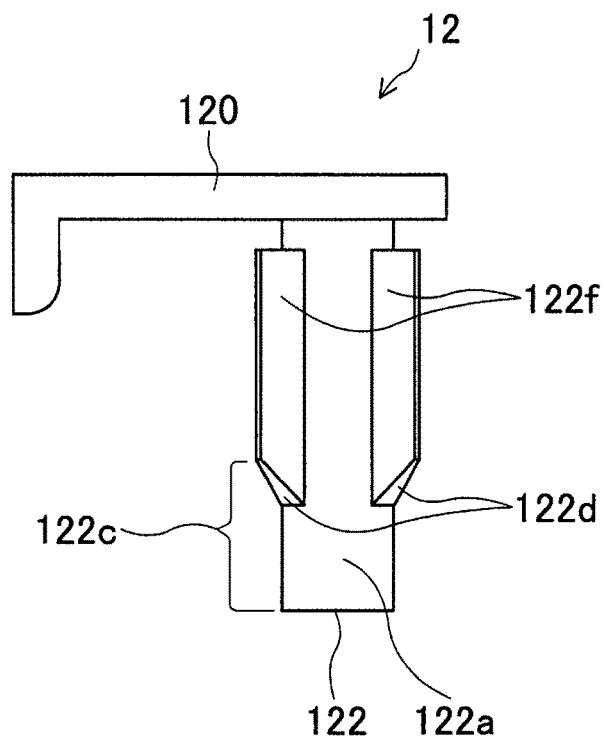
FIG. 20 is a side view showing the other side of the affixing member of the second embodiment.
Figure 21:
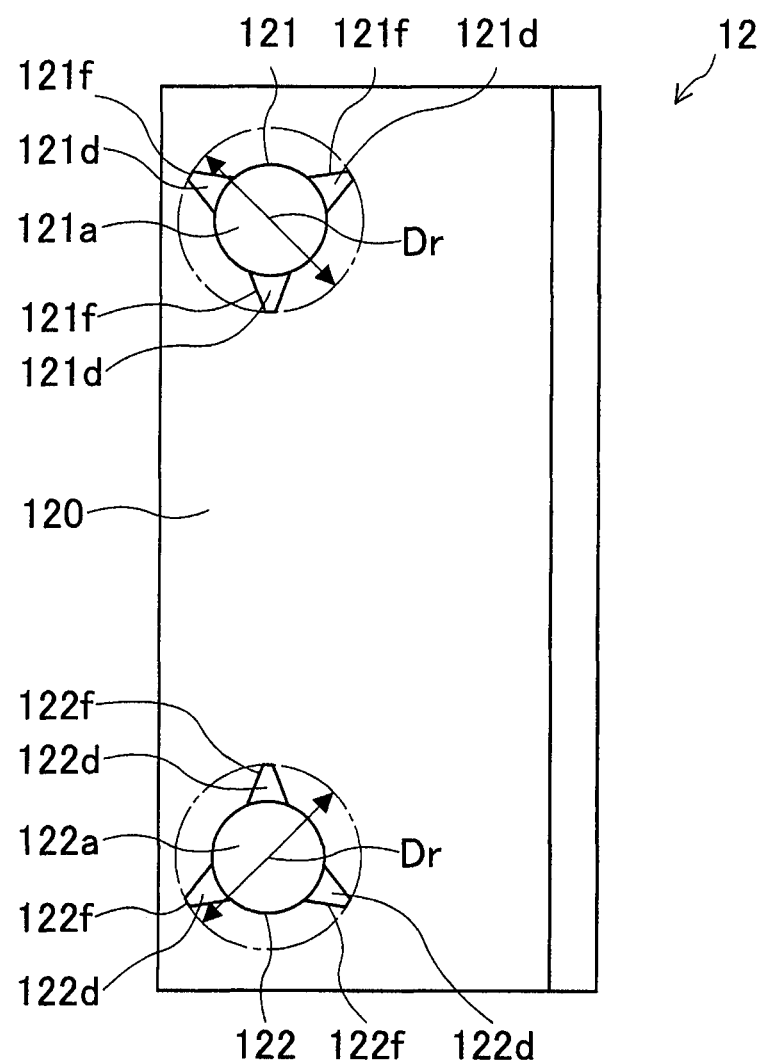
FIG. 21 is a bottom view showing the affixing member of the second embodiment.

As are shown in FIG. 19 to FIG. 21, an affixing member 12 has a pressing portion 120 and shaft portions 121 and 122. The shaft portions 121 and 122 have column portions 121a and 122a, ribs 121f and 122f, and convergent portions 121c and 122c, respectively.

Figure 22:
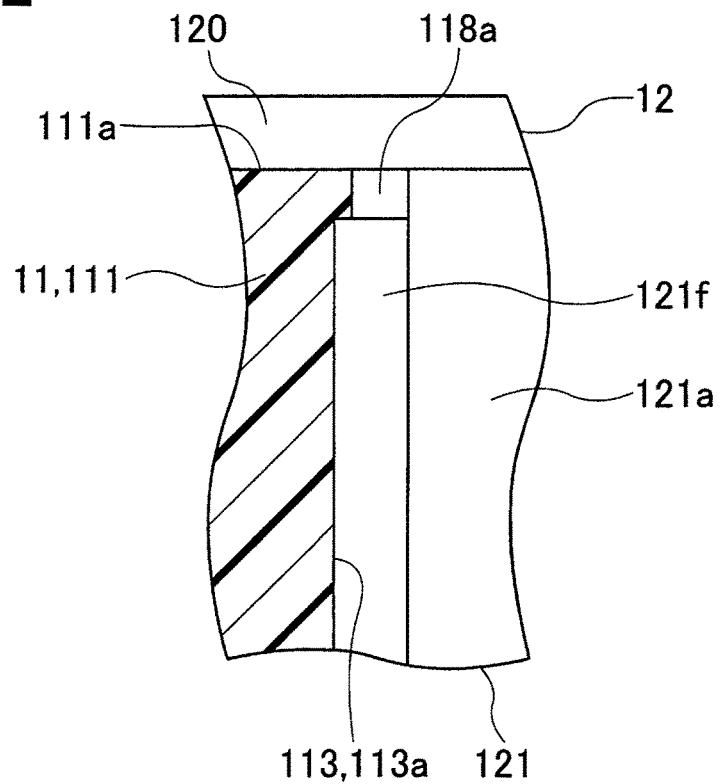
FIG. 22 is a first explanatory view used to describe a clearance portion.
Figure 23:
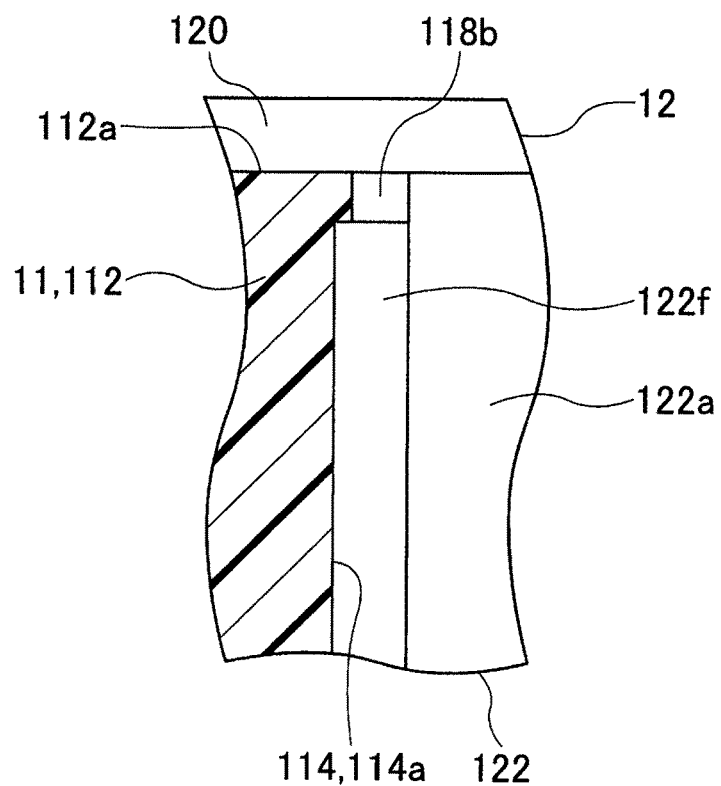
FIG. 23 is a second explanatory view used to describe a clearance portion.

The ribs 121f and 122f are different from the ribs 121b and 122b of the first embodiment above in that predetermined regions on a side of the pressing portion 120 are notched to outer peripheral surfaces of the column portions 121a and 122a, respectively. The ribs 121f and 122f are provided to extend in an axial direction from points slightly short of ends of the column portions 121a and 122a on the side of the pressing portion 120 to points slightly short of tip ends of the column portions 121a and 122a, respectively. Hence, outer peripheral surfaces of the shaft portions 121 and 122 at the ends on the side of the pressing portion 120 are spaced from inner peripheral surfaces of hole portions 113 and 114 to a shaft center side, respectively, at ends on the side of the pressing portion 120. Consequently, as are shown in FIG. 22 and FIG. 23, when the shaft portions 121 and 122 are inserted into the hole portions 113 and 114, respectively, until the pressing portion 120 makes contact with affixing surfaces 111a and 112a, which are surfaces of affixing portions 111 and 112, respectively, the shaft portions 121 and 122 and the hole portions 113 and 114 define clearance portions 118a and 118b, respectively, along entire circumferences between the outer peripheral surfaces of the shaft portions 121 and 122 at the ends on the side of the pressing portion 120 and the inner peripheral surfaces of the hole portions 113 and 114 at the ends on the side of the pressing portion 120, respectively.

The wheel speed detection device of the second embodiment is the same as the wheel speed detection device of the first embodiment above except for a shape of ribs on the pressing portion side. Hence, in principle, a detection element is affixed to a base member in the same manner as in the first embodiment above. The following will describe a difference from the wheel speed detection device of the first embodiment above with reference to FIG. 19 to FIG. 29 as to a manner in which to affix a detection element to a base member.

Figure 24:
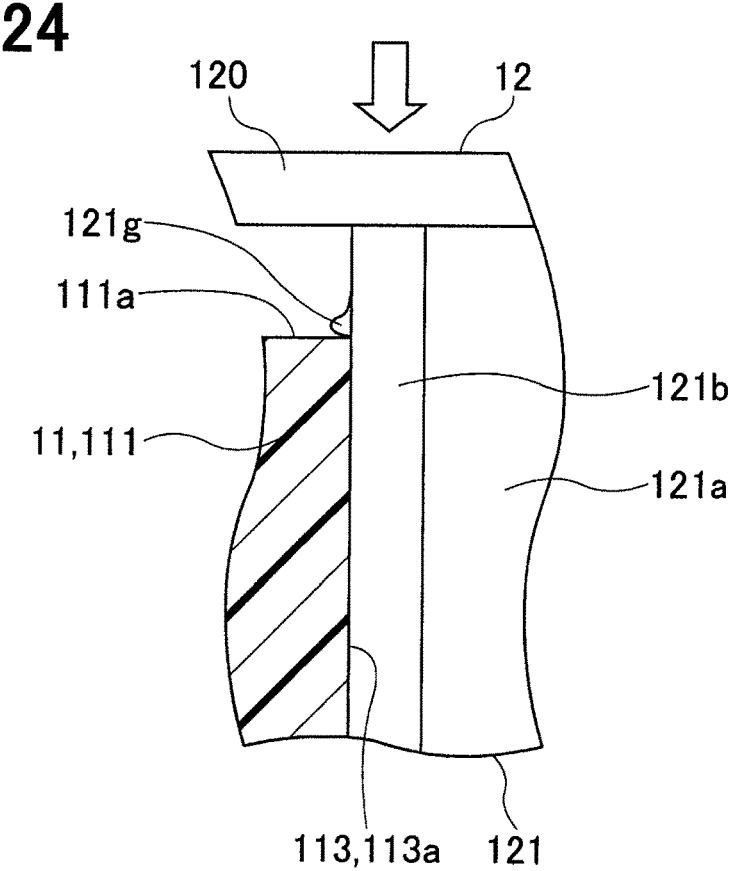
FIG. 24 is a first explanatory view used to describe an excess portion of the first embodiment.
Figure 25:
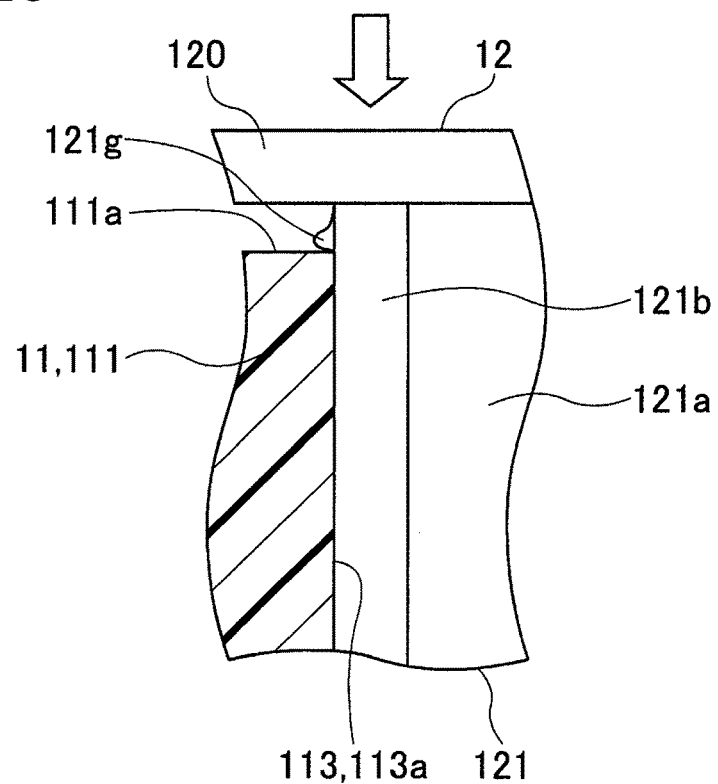
FIG. 25 is a second explanatory view used to describe the excess portion of the first embodiment.

In the first embodiment above, as is shown in FIG. 24, when the shaft portion 121 is inserted into the hole portion 113 by moving the affixing member 12 toward the base member 11, an excess portion 121g protruding radially outward is formed at a radial tip end of the rib 121b on a periphery of an opening of the hole portion 113 on the side of the pressing portion 120 and makes contact with the affixing surface 111a. As is shown in FIG. 25, when the affixing member 12 is moved further toward the base member 11 the excess portion 121g moves toward the pressing portion 120, and the excess portion 121g makes contact with the affixing surface 111a and the pressing portion 120. Hence, the pressing portion 120 cannot be pressed against the affixing surface 111a due to interference caused by the excess portion 121g. No issue occurs when a lead 101 is thick or the excess portion 121g is small. However, when the lead 101 is thin or the excess portion 121g is large, the lead 101 may not be pressed against the affixing portion 111 by the pressing portion 120.

As are shown in FIG. 19 to FIG. 21, the ribs 121f and 122f of the second embodiment are different from the ribs 121b and 122b of the first embodiment above in that predetermined regions on the side of the pressing portion 120 are notched to the outer peripheral surfaces of the column portions 121a and 122a, respectively. The ribs 121f and 122f are provided to extend in the axial direction from points slightly short of the ends of the column portions 121a and 122a on the side of the pressing portion 120 to points slightly short of tip ends of the column portions 121a and 122a, respectively. Hence, as are shown in FIG. 22 and FIG. 23, when the shaft portions 121 and 122 are inserted into the hole portions 113 and 114, respectively, until the pressing portion 120 makes contact with the affixing surfaces 111a and 112a, the shaft portions 121 and 122 and the hole portions 113 and 114 define the clearance portions 118a and 118b, respectively, along entire circumferences between the outer peripheral surfaces of the shaft portions 121 and 122, which are at the ends on the side of the pressing portion 120, and the inner peripheral surfaces of the hole portions 113 and 114, which are at the ends on the side of the pressing portion 120, respectively.

Figure 28:
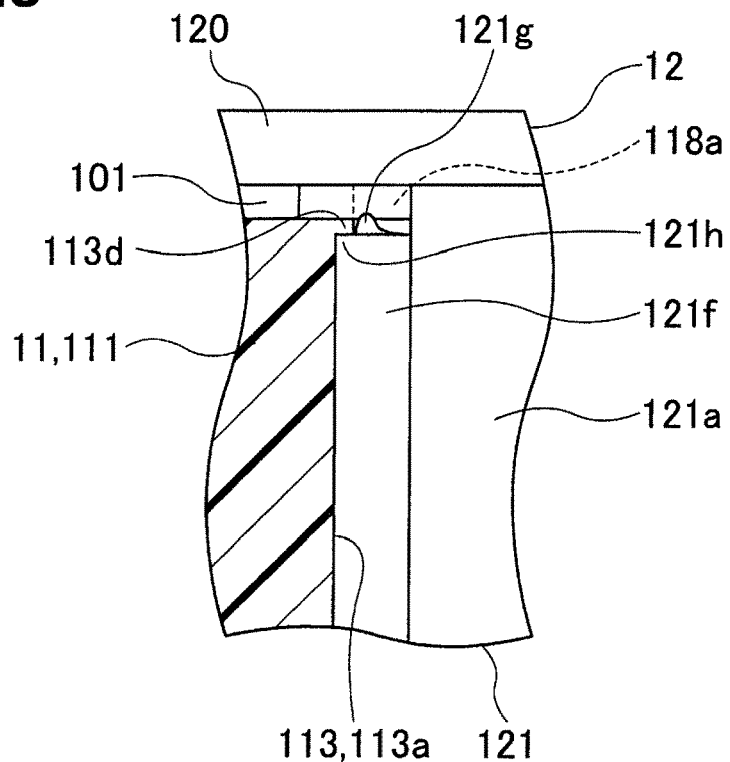
FIG. 28 is a partial enlarged view showing a periphery of one rib.
Figure 29:
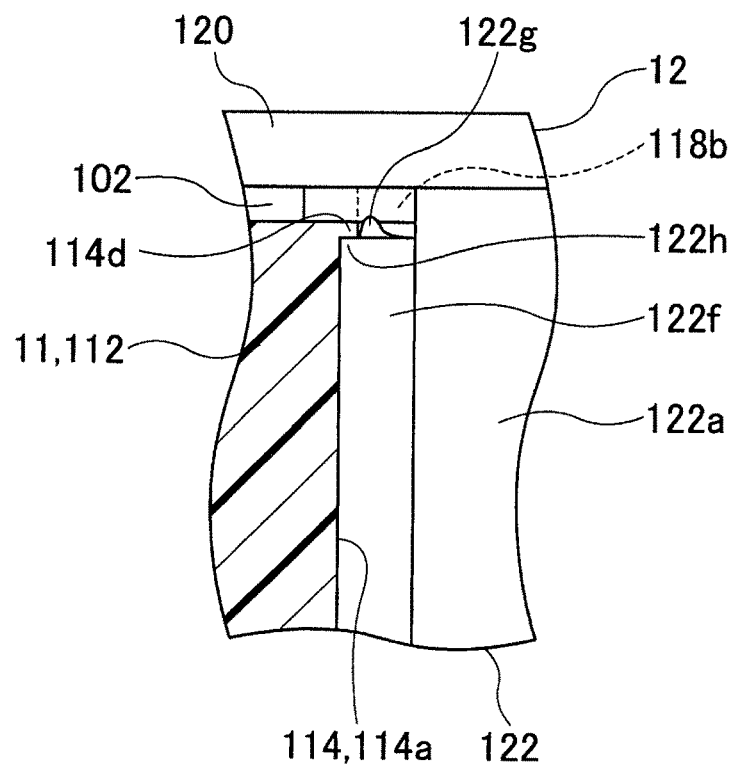
FIG. 29 is a partial enlarged view showing a periphery of the other rib.

Hence, as are shown in FIG. 26 and FIG. 27, even in a case where excess portions 121g and 122g are formed at radial tip ends of the ribs 121f and 122f, respectively, on peripheries of openings of the hole portions 113 and 114 on the side of the pressing portion 120 when the shaft portions 121 and 122 are inserted into the hole portions 113 and 114, respectively, the excess portions 121g and 122g are retracted into the clearance portions 118a and 118b, respectively. The pressing portion 120 can be thus pressed against the affixing surfaces 111a and 112a. Hence, even when leads 101 and 102 are thin or the excess portions 121g and 122g are large, as are shown in FIG. 28 and FIG. 29, the leads 101 and 102 can be pressed against the affixing portions 111 and 112, respectively, by the pressing portion 120 without being interfered by the excess portions 121g and 122g, respectively.

Interference fit portions 113a and 114a expand in diameter when the ribs 121f and 122f pass through. That is, portions making contact with the radial tip ends of the ribs 121f and 122f expand radially outward. After the ribs 121f and 122f pass through, the portions, which have expanded in diameter, recover to original states by shrinking in diameter. That is, the portions which have expanded in diameter recover to original states by shrinking radially inward. Consequently, step portions 113d and 114d are formed at ends of the ribs 121f and 122f, respectively, on the side of the pressing portion 120 and on the side of the pressing portion 120 of the respective ends. The step portions 113d and 114d engage with corners 121h and 122h of the ribs 121f and 122f, respectively, at the ends on the side of the pressing portion 120. The affixing member 12 can be thus prevented from falling off.

Effects of the wheel speed detection device of the second embodiment will now be described.

According to the second embodiment having the same configuration as the configuration of the first embodiment above, effects same as effects obtained in the first embodiment above by the same configuration can be produced, too.

According to the second embodiment, when the shaft portions 121 and 122 are inserted into the hole portions 113 and 114, respectively, until the pressing portion 120 makes contact with the affixing surfaces 111a and 112a, the shaft portions 121 and 122 and the hole portions 113 and 114 define the clearance portions 118a and 118b, respectively, along the entire circumferences between the outer peripheral surfaces of the shaft portions 121 and 122 at the ends on the side of the pressing portion 120 and the inner peripheral surfaces of the hole portions 113 and 114 at the ends on the side of the pressing portion 120, respectively. Hence, even in a case where the excess portions 121g and 122g are formed when the shaft portions 121 and 122 are inserted into the hole portions 113 and 114, respectively, the excess portions 121g and 122g are retracted into the clearance portions 118a and 118b, respectively. Consequently, predetermined regions of the leads 101 and 102 close to a main body can be pressed against the base member 11 by the pressing portion 120 in a reliable manner.

According to the second embodiment, the outer peripheral surfaces of the shaft portions 121 and 122 at the ends on the side of the pressing portion 120 are spaced from the inner peripheral surfaces of the hole portions 113 and 114 to the shaft center side, respectively, at the ends on the side of the pressing portion 120. Consequently, when the shaft portions 121 and 122 are inserted into the hole portions 113 and 114, respectively, until the pressing portion 120 makes contact with the affixing surfaces 111a and 112a, the clearance portions 118a and 118b can be provided in a reliable manner along the entire circumferences between the outer peripheral surfaces of the shaft portions 121 and 122 at the ends on the side of the pressing portion 120 and the inner peripheral surfaces of the hole portions 113 and 114 at the ends on the side of the pressing portion 120, respectively. The step portions 113d and 114d are formed on the side of the pressing portion 120 at the ends of the ribs 121f and 122f, respectively, on the side of the pressing portion 120 of the respective ends. The step portions 113d and 114d engage with the corners 121h and 122h of the ribs 121f and 122f, respectively, at the ends on the side of the pressing portion 120. The affixing member 12 can be thus prevented from falling off.

Figure 30:
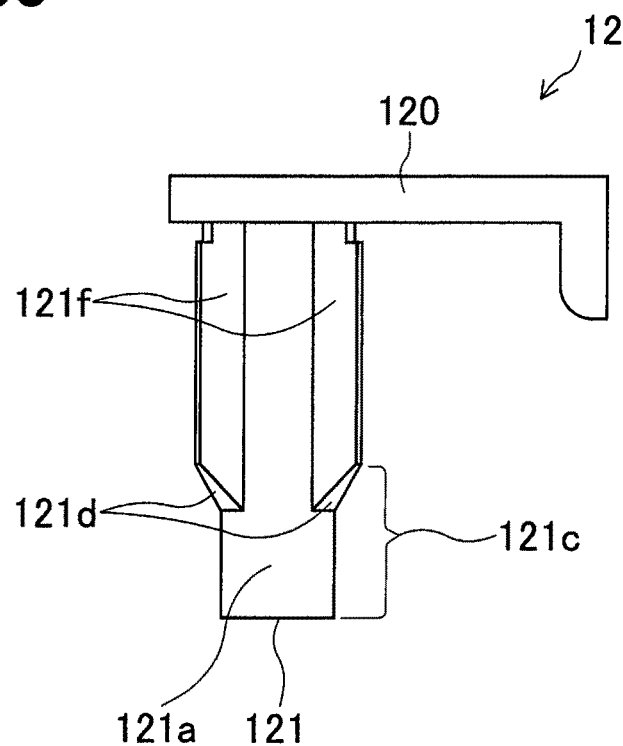
FIG. 30 is a side view showing an affixing member in a modification.

The second embodiment has described an example where the ribs 121f and 122f are provided to extend in the axial direction from points slightly short of the ends of the column portions 121a and 122a on the side of the pressing portion 120 to points slightly short of the tip ends of the column portions 121a and 122a, respectively. However, the present disclosure is not limited to the described example. As is shown in FIG. 30, the ribs 121f and 122f may be provided to extend in the axial direction, respectively, from the ends of the column portions 121a and 122a on the side of the pressing portion 120, and predetermined regions at radial tip ends on the side of the pressing portion 120 may be notched.

Figure 31:
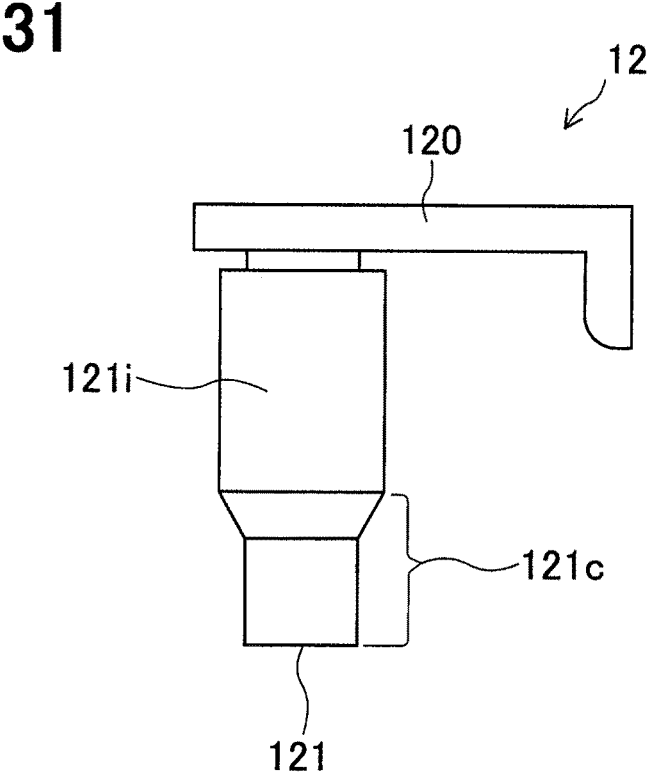
FIG. 31 is a side view showing an affixing member in another modification.

The second embodiment has described an example where three ribs 121f and three ribs 122f are provided to the shaft portions 121 and 122, respectively. However, the present disclosure is not limited to the described example. Two or four or more ribs may be provided to one shaft portion. Alternatively, as is shown in FIG. 31, it may be set in such a manner that an outer diameter of a column portion 121i is fitted to a hole portion with interference without providing ribs at all.

Figure 32:
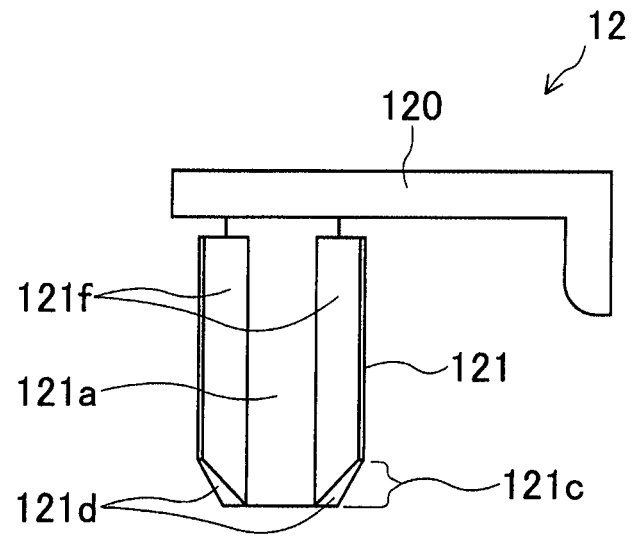
FIG. 32 is a side view showing an affixing member in still another modification.
Figure 33:
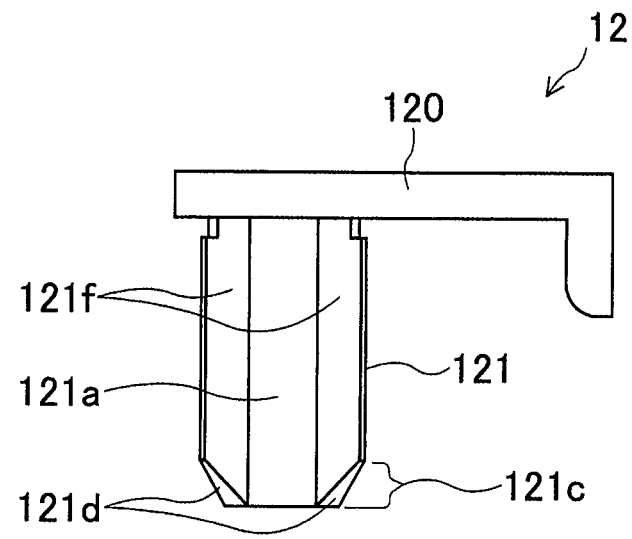
FIG. 33 is a side view showing an affixing member in yet another modification.

The second embodiment has described an example where the convergent portion 121c is formed of the taper portion 121d and a tip end of the column portion 121a. However, the present disclosure is not limited to the described example. As is shown in FIG. 32, the convergent portion 121c may be formed of a taper portion 121d and a tip end face of the column portion 121a. Further, as is shown in FIG. 33, the ribs 121f may be provided to extend in the axial direction from the end of the column portion 121a on the side of the pressing portion 120 and a predetermined region at a radial tip end on the side of the pressing portion 120 may be notched.

Third Embodiment

A wheel speed detection device of a third embodiment will now be described. The wheel speed detection device of the third embodiment is different from the wheel speed detection device of the first embodiment above in that a clearance portion is provided along an entire circumference between an outer peripheral surface of a shaft portion on a pressing portion side and an inner peripheral surface of a hole portion on a pressing portion side by changing a shape of the hole portion of a base member.

The wheel speed detection device of the third embodiment is the same as the wheel speed detection device of the first embodiment above except in a shape of the hole portion on the pressing portion side. Hence, components other than hole portions will not be described herein. A configuration of a base member of the third embodiment will be described first with reference to FIG. 34 to FIG. 36.

Figure 34:
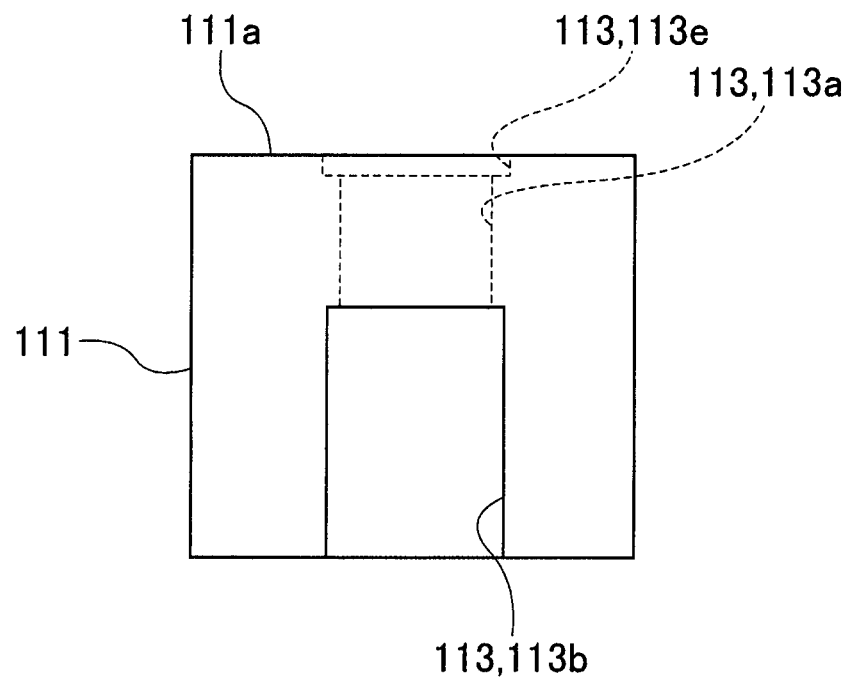
FIG. 34 is a side view showing one affixing portion of a third embodiment.
Figure 35:
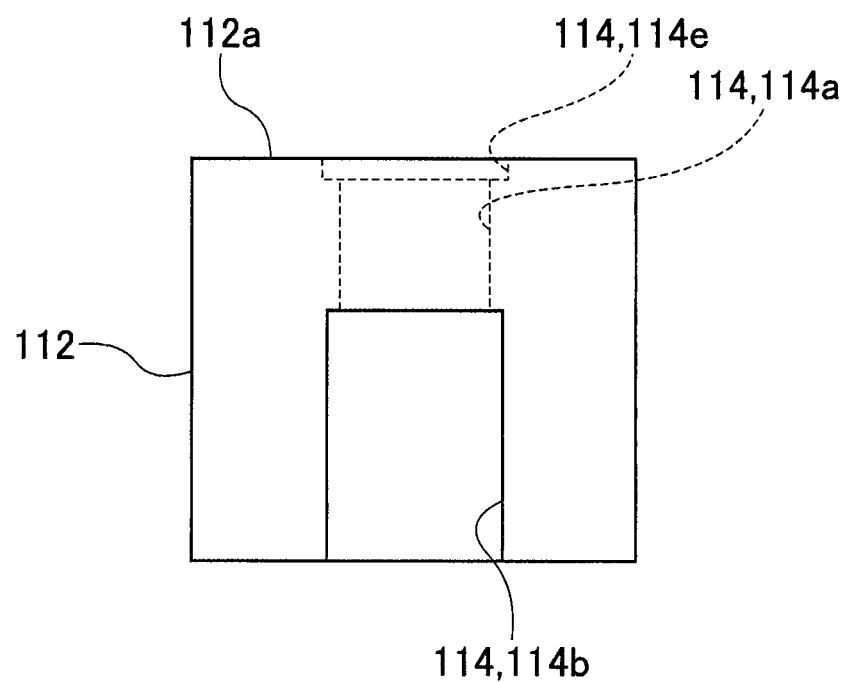
FIG. 35 is a side view showing the other affixing portion of the third embodiment.
Figure 36:
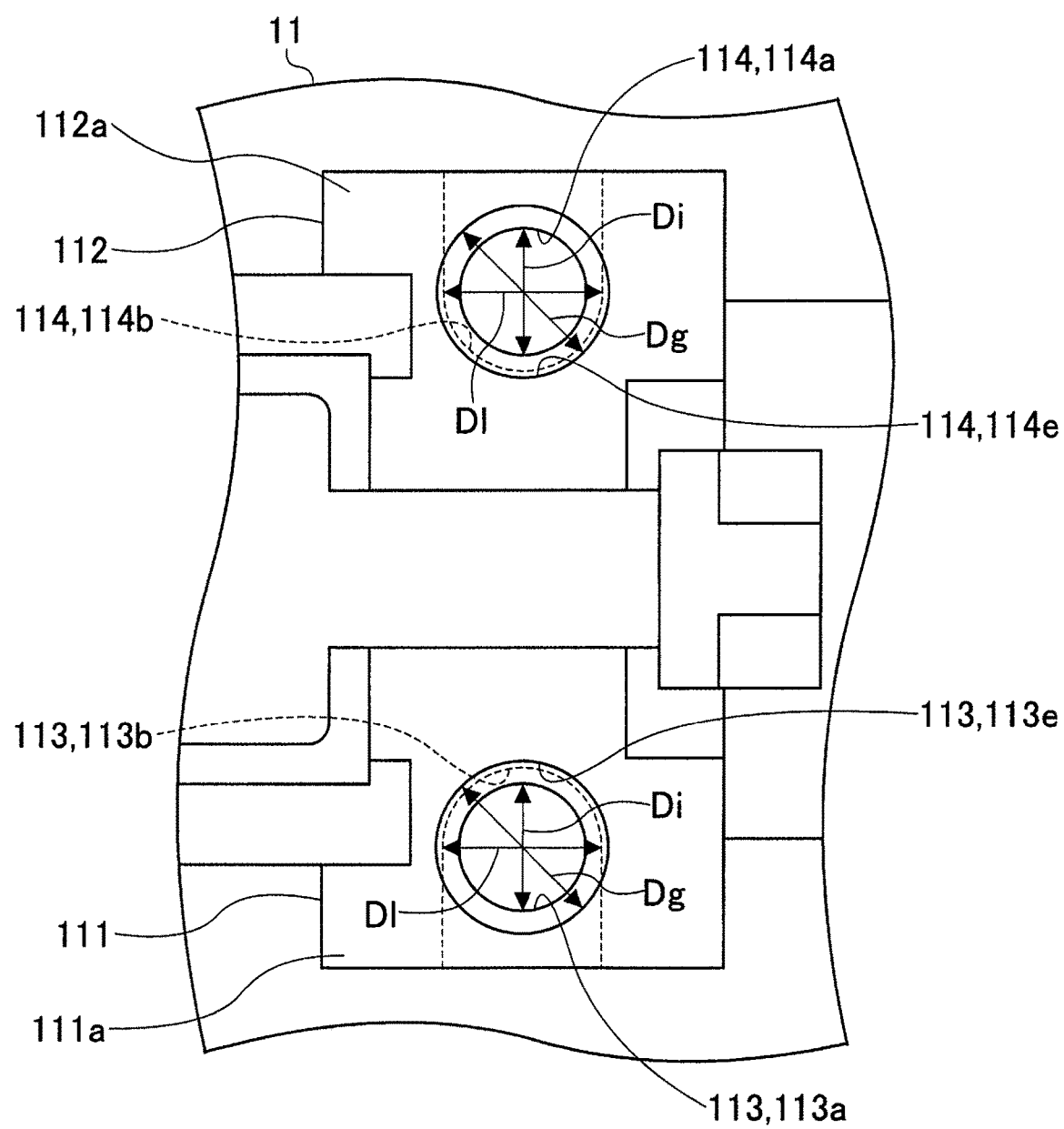
FIG. 36 is a top view showing a periphery of the affixing portions of the third embodiment.

As are shown in FIG. 34 to FIG. 36, a base member 11 has affixing portions 111 and 112 and hole portions 113 and 114. The hole portions 113 and 114 have interference fit portions 113a and 114a, clearance fit portions 113b and 114b, and large diameter portions 113e and 114e, respectively.

Figure 37:
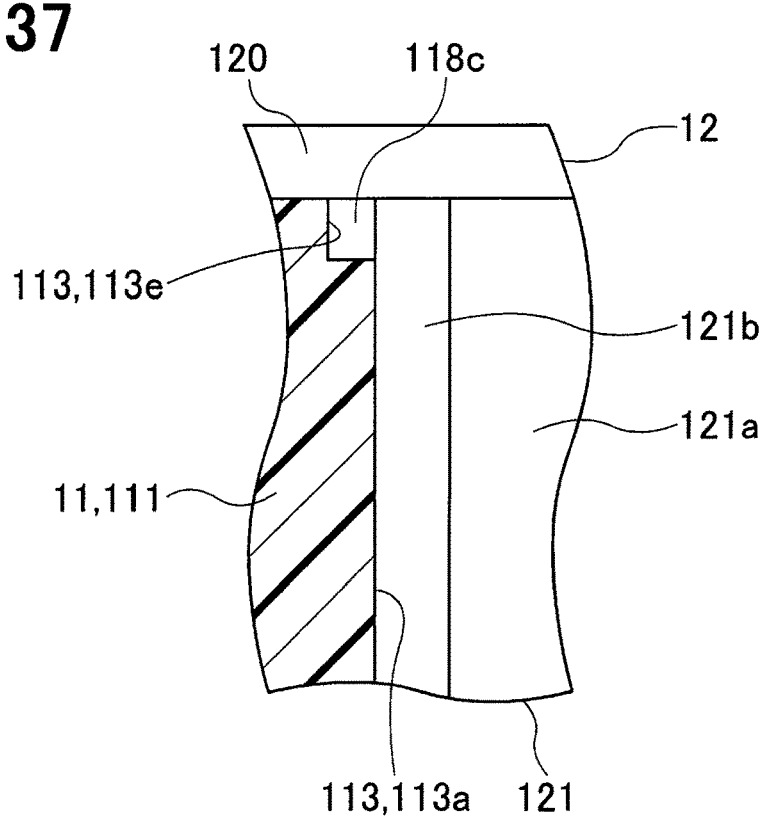
FIG. 37 is a first explanatory view used to describe a clearance portion.
Figure 38:
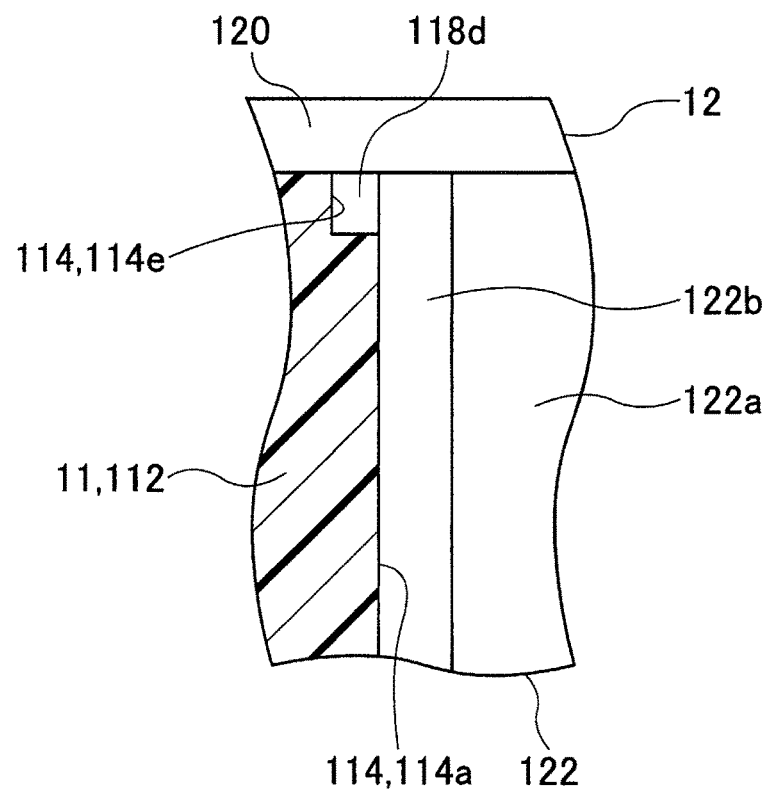
FIG. 38 is a second explanatory view used to describe a clearance portion.

The large diameter portions 113e and 114e are portions which define clearance portions with shaft portions 121 and 122, respectively. More specifically, the large diameter portions 113e and 114e are portions having an inner diameter larger than an outer diameter of the shaft portions 121 and 122. To be more specific, the large diameter portions 113e and 114e are portions having an inner diameter Dg larger than a diameter Dr of circles formed by ribs 121b and 122b. The large diameter portions 113e and 114e are provided at ends on a shaft portion inserted side, which is a side of inlets from which the shaft portions 121 and 122 are inserted. Inner peripheral surfaces of the hole portions 113 and 114 at ends on a side of the pressing portion 120 are spaced from outer peripheral surfaces of the shaft portions 121 and 122 to an opposite side to a shaft center side, respectively, at the ends on the side of the pressing portion 120. Consequently, as are shown in FIG. 37 and FIG. 38, when the shaft portions 121 and 122 are inserted into the hole portions 113 and 114, respectively, until the pressing portion 120 makes contact with affixing surfaces 111a and 112a, which are surfaces of the affixing portions 111 and 112, respectively, the shaft portions 121 and 122 and the hole portions 113 and 114 define clearance portions 118c and 118d, respectively, along entire circumferences between the outer peripheral surfaces of the shaft portions 121 and 122 at the ends on the side of the pressing portion 120 and the inner peripheral surfaces of the hole portions 113 and 114 at the ends on the side of the pressing portion 120, respectively.

The wheel speed detection device of the third embodiment is the same as the wheel speed detection device of the first embodiment above except for a shape of a hole portion on the pressing portion side. Hence, in principle, a detection element is affixed to a base member in the same manner as in the first embodiment above. The following will describe a difference from the wheel speed detection device of the first embodiment above with reference to FIG. 34 to FIG. 42 as to a manner in which to affix a detection element to a base member.

As are shown in FIG. 34 to FIG. 36, at the ends on the shaft portion inserted side, the hole portions 113 and 114 respectively have the large diameter portions 113e and 114e having the inner diameter Dg larger than the diameter Dr of circles formed by the ribs 121b and 122b. Hence, as are shown in FIG. 37 and FIG. 38, when the shaft portions 121 and 122 are inserted into the hole portions 113 and 114, respectively, until the pressing portion 120 makes contact with the affixing surfaces 111a and 112a, the shaft portions 121 and 122 and the hole portions 113 and 114 define the clearance portions 118c and 118d, respectively, along the entire circumferences between the outer peripheral surfaces of the shaft portions 121 and 122 at the ends on the side of the pressing portion 120 and the inner peripheral surfaces of the hole portions 113 and 114 at the ends on the side of the pressing portion 120, respectively.

Figure 39:
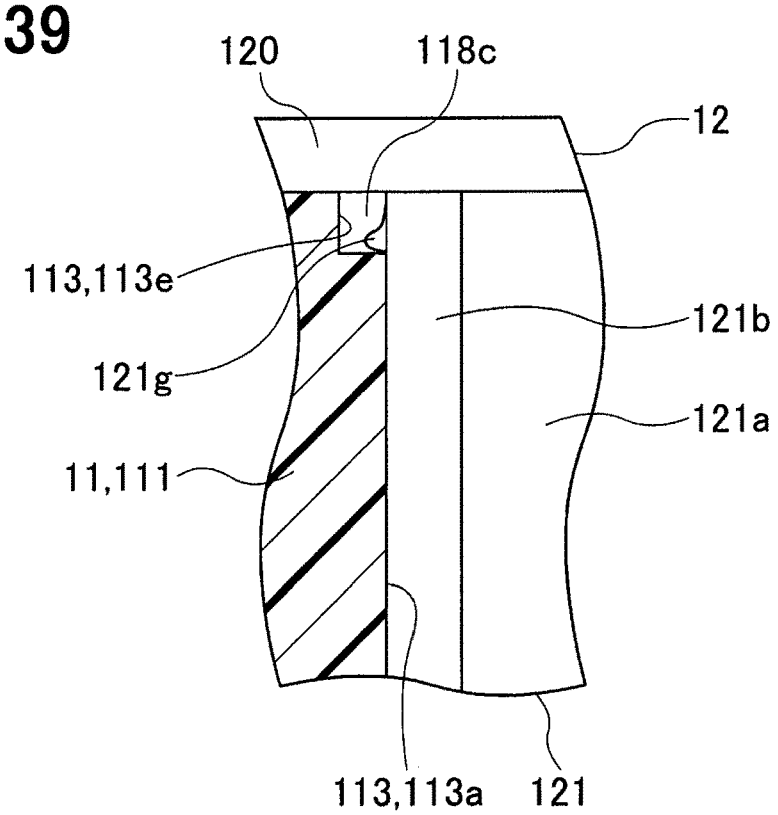
FIG. 39 is a first explanatory view used to describe a relationship between an excess portion and the clearance portion.
Figure 40:
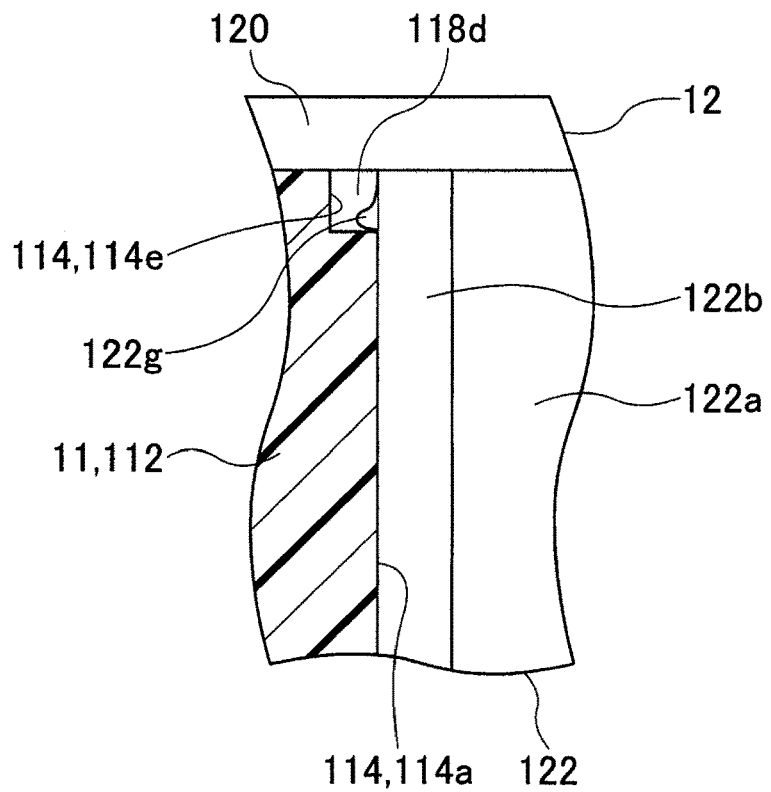
FIG. 40 is a second explanatory view used to describe a relationship between an excess portion and the clearance portion.
Figure 41:
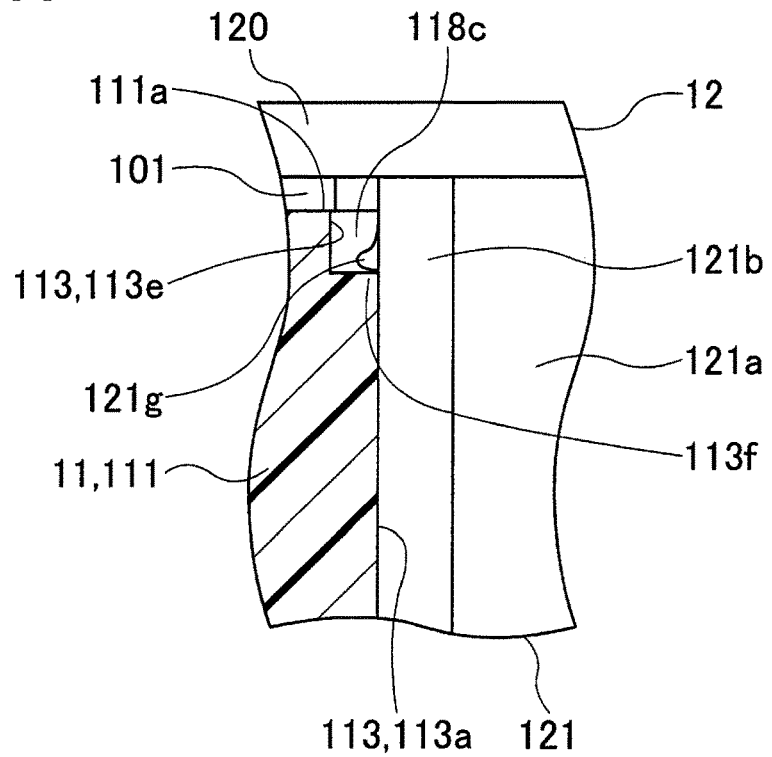
FIG. 41 is a partial enlarged view showing a periphery of one rib.
Figure 42:
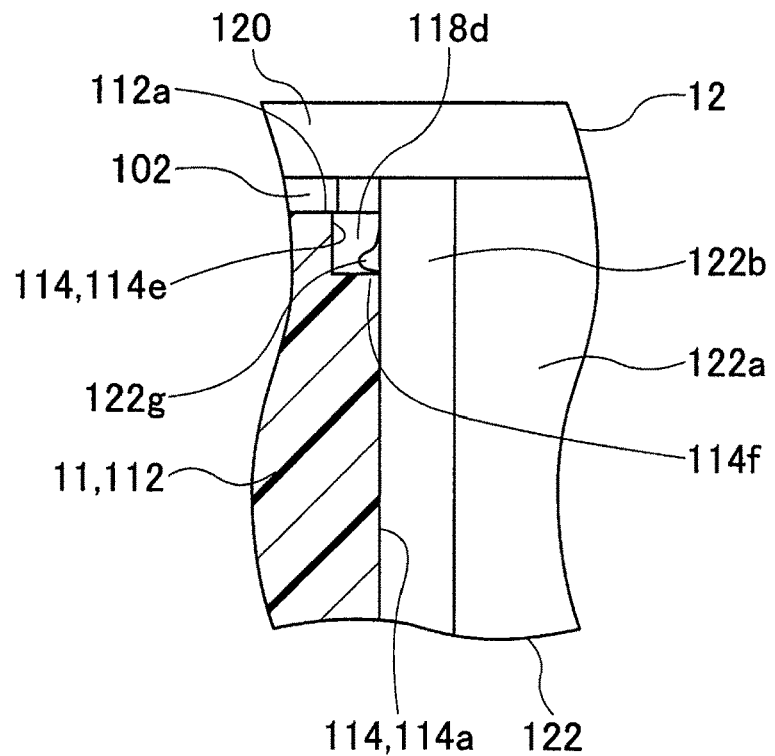
FIG. 42 is a partial enlarged view showing a periphery of the other rib.

Hence, as are shown in FIG. 39 and FIG. 40, even in a case where excess portions 121g and 122g are formed at radial tip ends of the ribs 121b and 122b, respectively, when the shaft portions 121 and 122 are inserted into the hole portions 113 and 114, respectively, the excess portions 121g and 122g are retracted into the clearance portions 118c and 118d, respectively. The pressing portion 120 can be thus pressed against the affixing surfaces 111a and 112a. Hence, even when leads 101 and 102 are thin or the excess portions 121g and 122g are large, as are shown in FIG. 41 and FIG. 42, the leads 101 and 102 can be pressed against the affixing portions 111 and 112, respectively, by the pressing portion 120 without being interfered by the excess portions 121g and 122g, respectively.

Effects of the wheel speed detection device of the third embodiment will now be described.

According to the third embodiment having the same configuration as the configuration of the first embodiment above, effects same as effects obtained in the first embodiment above by the same configuration can be produced, too.

According to the third embodiment, when the shaft portions 121 and 122 are inserted into the hole portions 113 and 114, respectively, until the pressing portion 120 makes contact with the affixing surfaces 111a and 112a, the shaft portions 121 and 122 and the hole portions 113 and 114 define the clearance portions 118c and 118d, respectively, along the entire circumferences between the outer peripheral surfaces of the shaft portions 121 and 122 at the ends on the side of the pressing portion 120 and the inner peripheral surfaces of the hole portions 113 and 114 at the ends on the side of the pressing portion 120, respectively. Hence, even in a case where the excess portions 121g and 122g are formed when the shaft portions 121 and 122 are inserted into the hole portions 113 and 114, respectively, the excess portions 121g and 122g are retracted into the clearance portions 118c and 118d, respectively. Consequently, predetermined regions of the leads 101 and 102 close to a main body can be pressed against the base member 11 by the pressing portion 120 in a reliable manner.

According to the third embodiment, the inner peripheral surfaces of the hole portions 113 and 114 at the ends on the side of the pressing portion 120 are spaced from the outer peripheral surfaces of the shaft portions 121 and 122, respectively, to an opposite side to the shaft center side at the ends on the side of the pressing portion 120. Consequently, when the shaft portions 121 and 122 are inserted into the hole portions 113 and 114, respectively, until the pressing portion 120 makes contact with the affixing surfaces 111a and 112a, the clearance portions 118c and 118d can be provided in a reliable manner along the entire circumferences between the outer peripheral surfaces of the shaft portions 121 and 122 at the ends on the side of the pressing portion 120 and the inner peripheral surfaces of the hole portions 113 and 114 at the ends on the side of the pressing portion 120, respectively.

Figure 6:
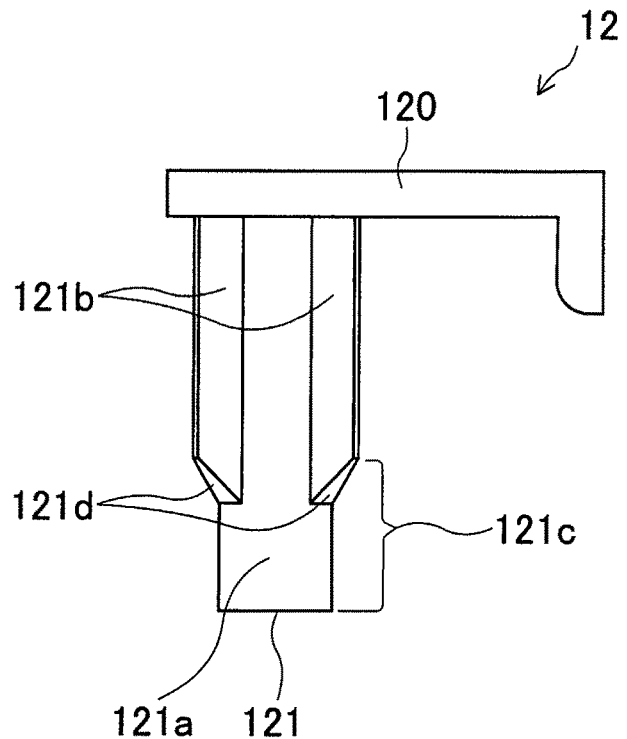
FIG. 6 is a side view showing one side of an affixing member of FIG. 1.
Figure 7:
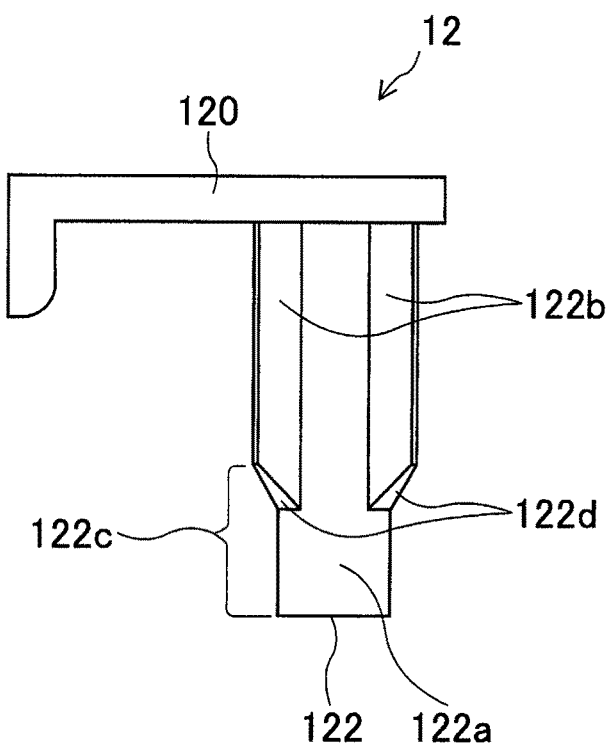
FIG. 7 is a side view showing the other side of the affixing member of FIG.
Figure 8:
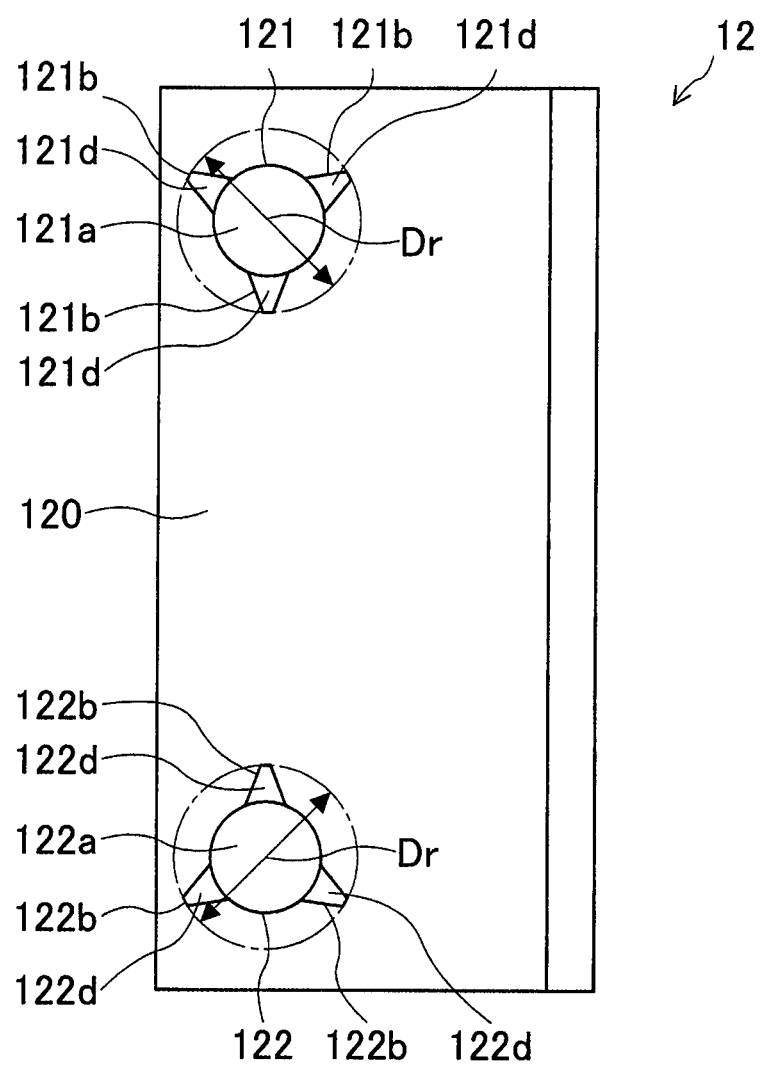
FIG. 8 is a bottom view showing the affixing member of FIG. 1.
Figure 9:
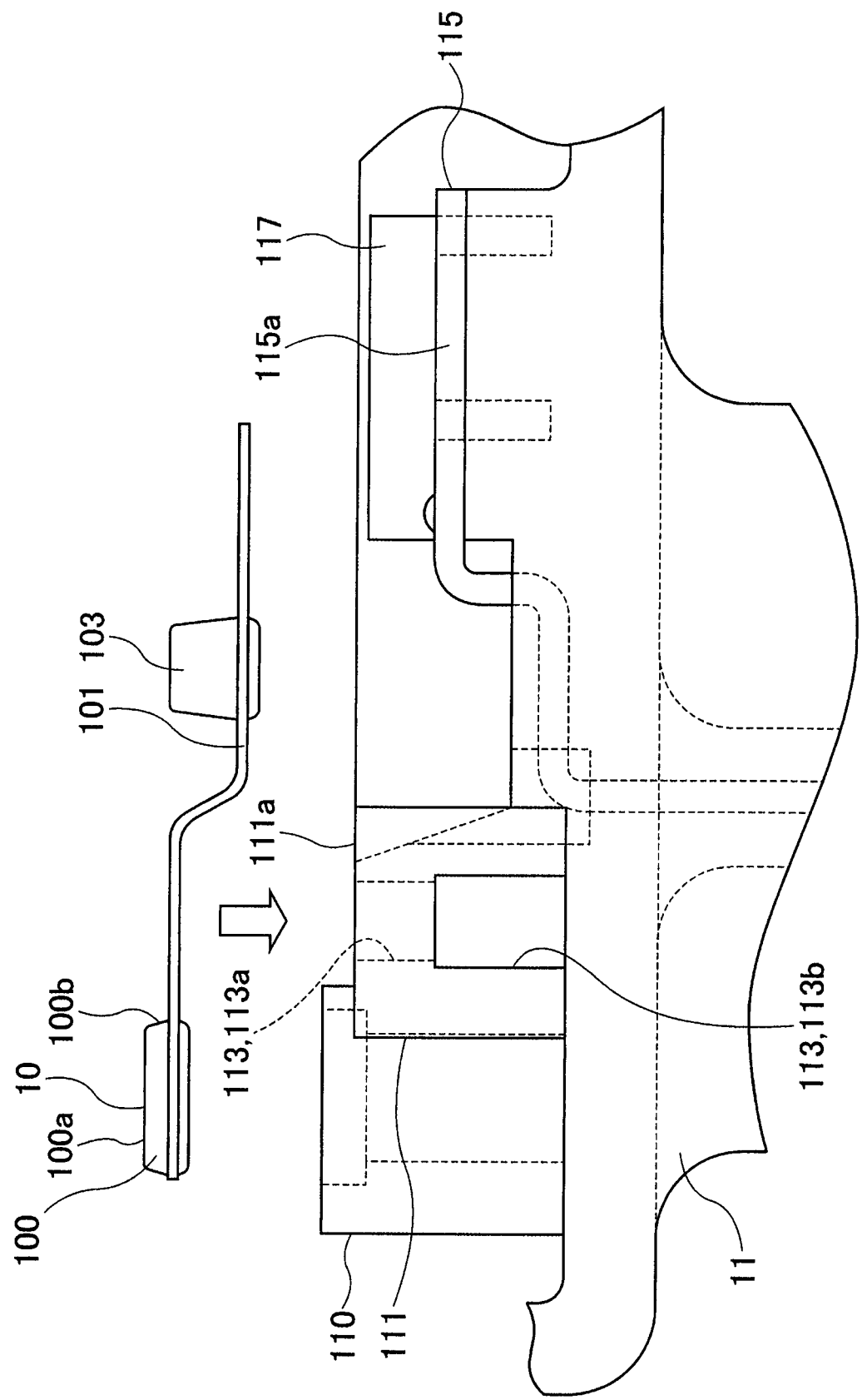
FIG. 9 is a first explanatory view used to describe a manner in which to affix the detection element to the base member.
Figure 10:
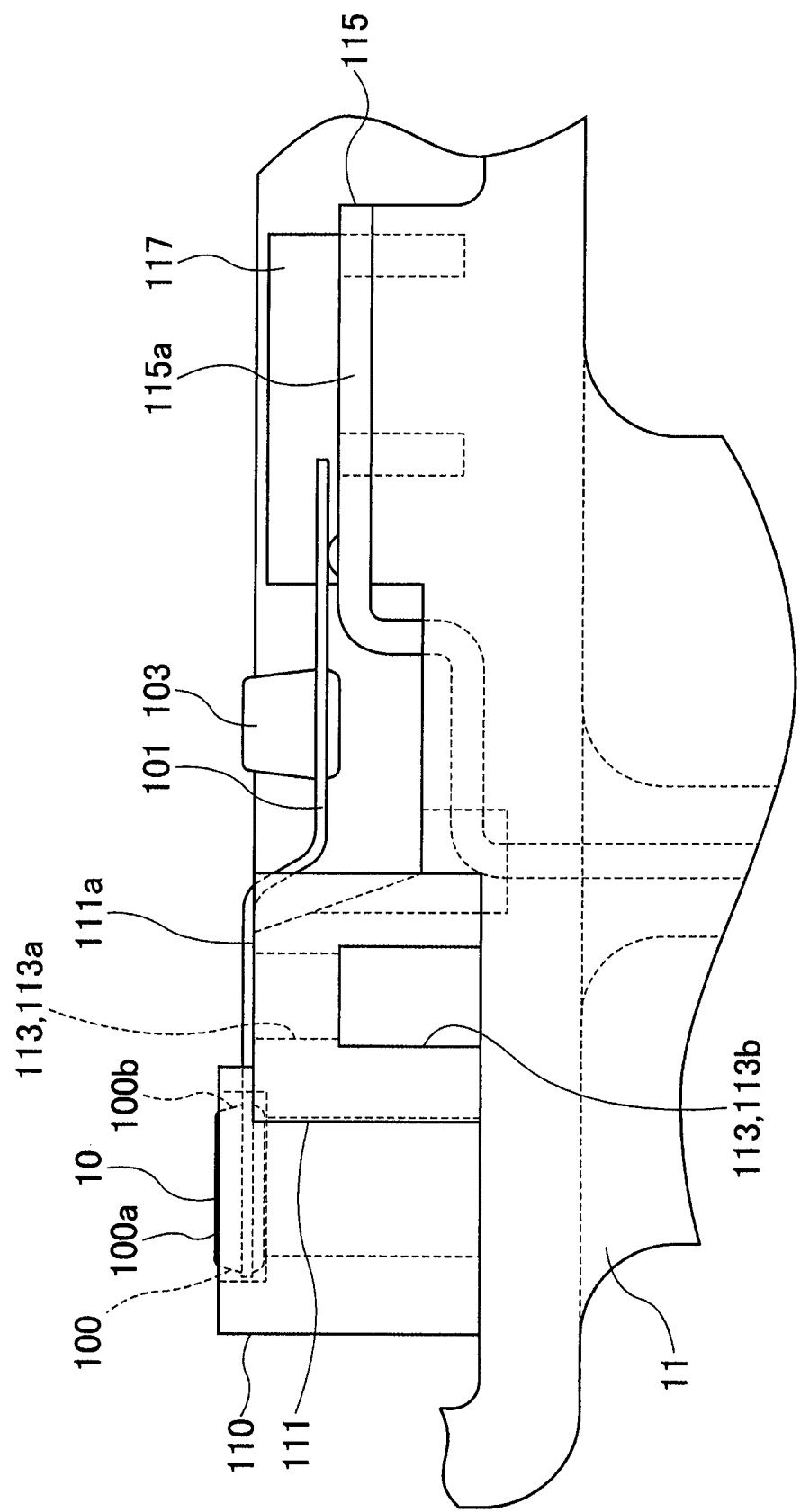
FIG. 10 is a second explanatory view used to describe the manner in which to affix the detection element to the base member.
Figure 11:
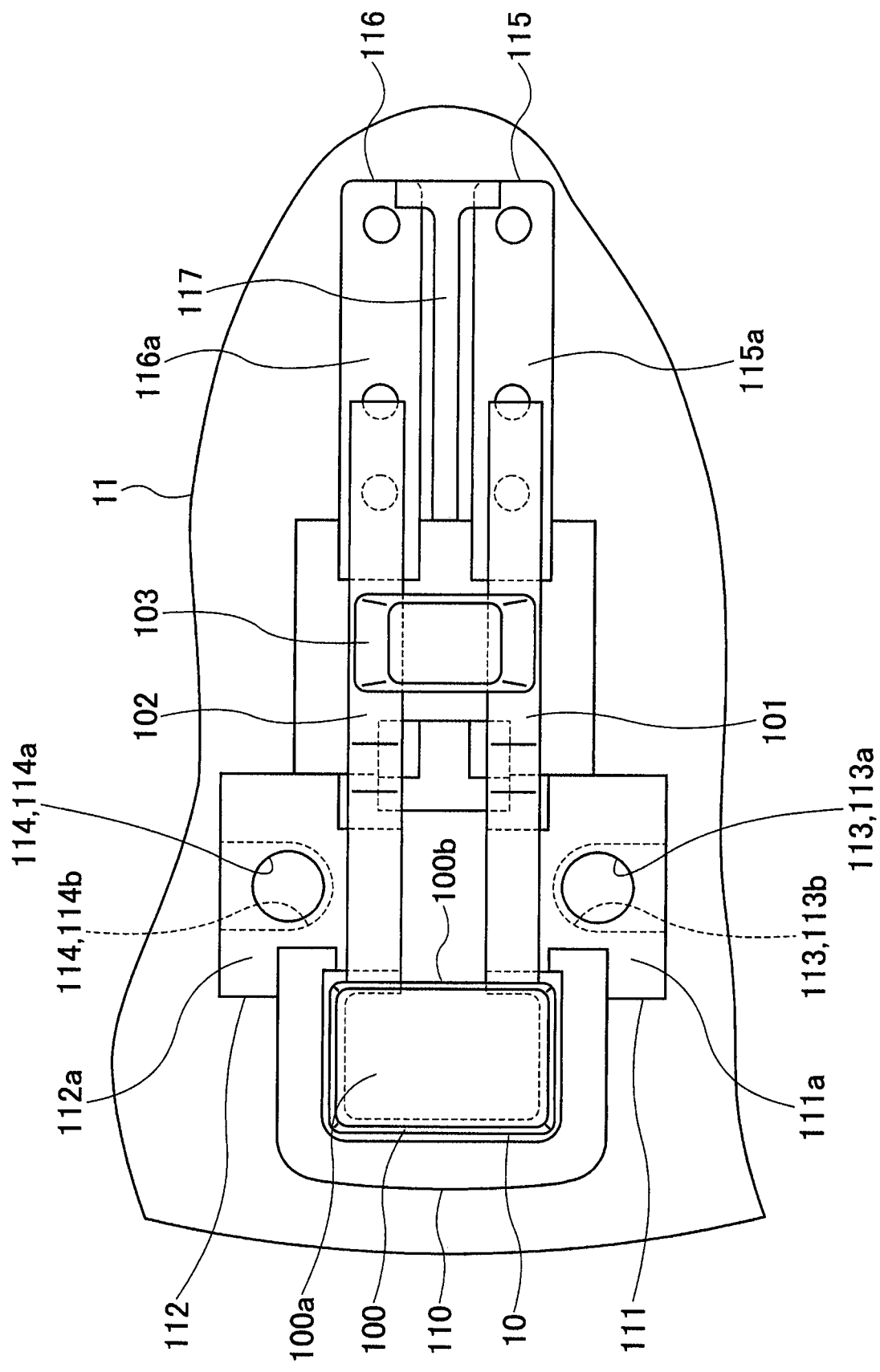
FIG. 11 is a third explanatory view used to describe the manner in which to affix the detection element to the base member.
Figure 12:
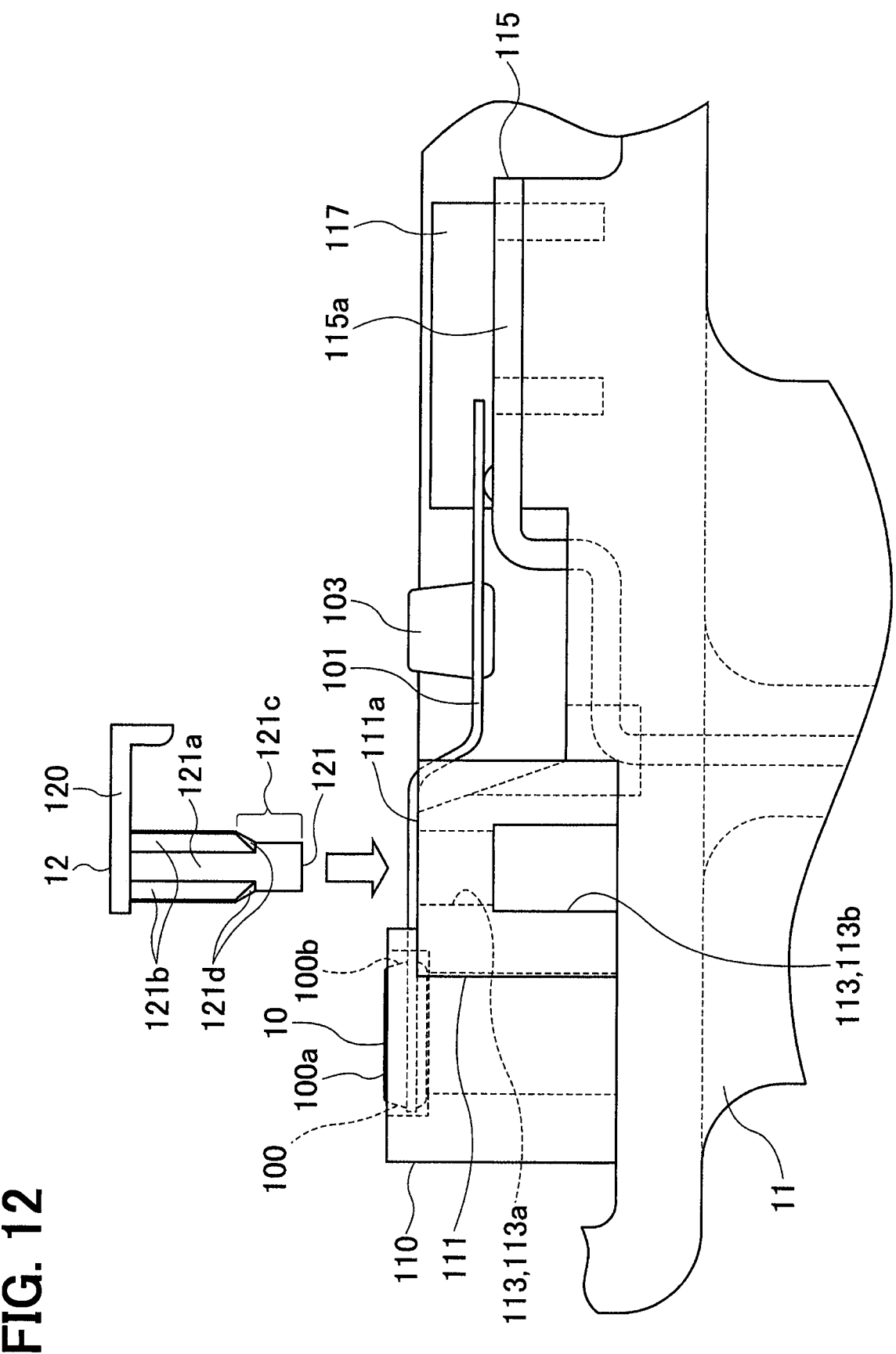
FIG. 12 is a fourth explanatory view used to describe the manner in which to affix the detection element to the base member.
Figure 13:
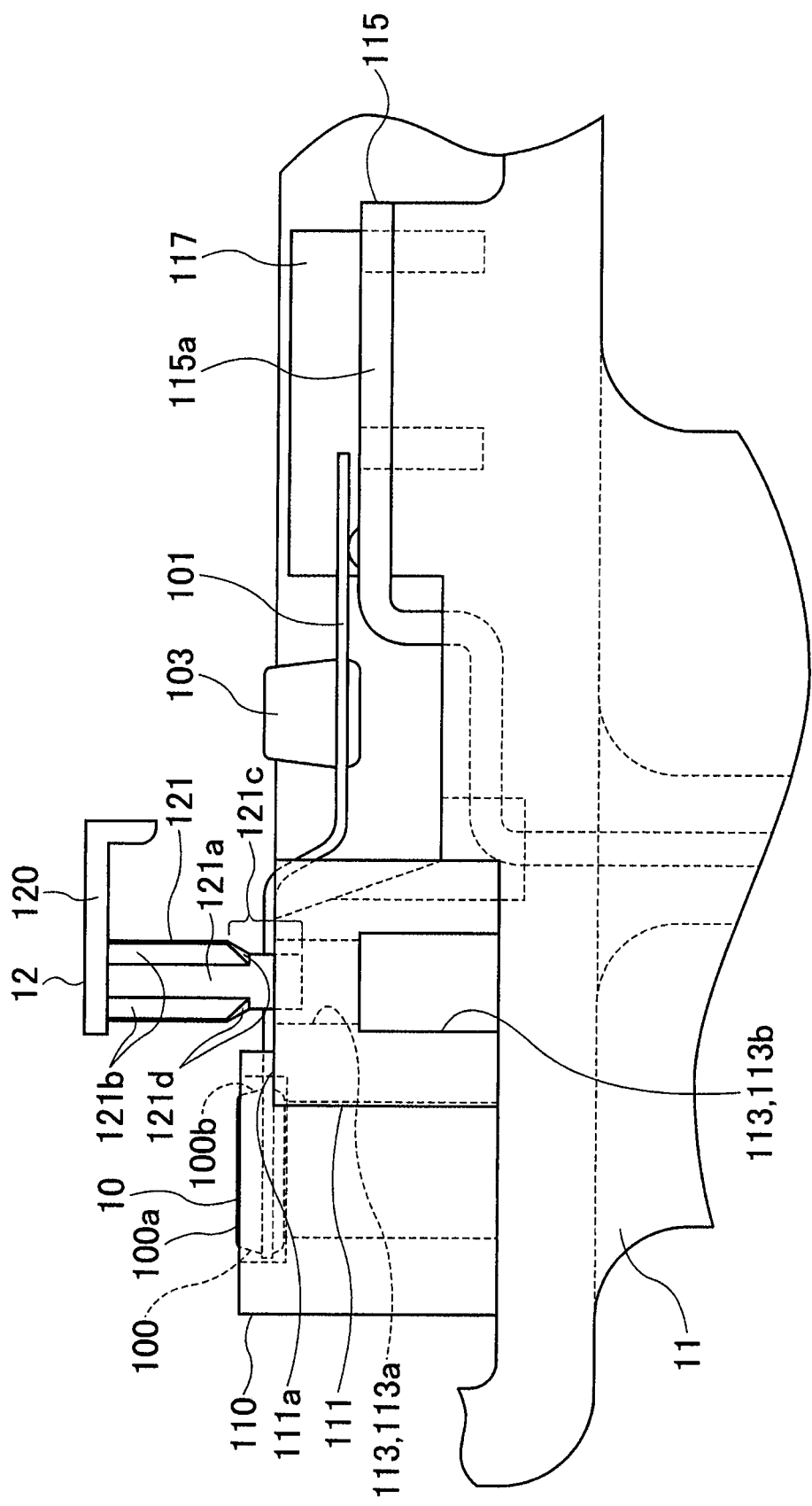
FIG. 13 is a fifth explanatory view used to describe the manner in which to affix the detection element to the base member.
Figure 14:
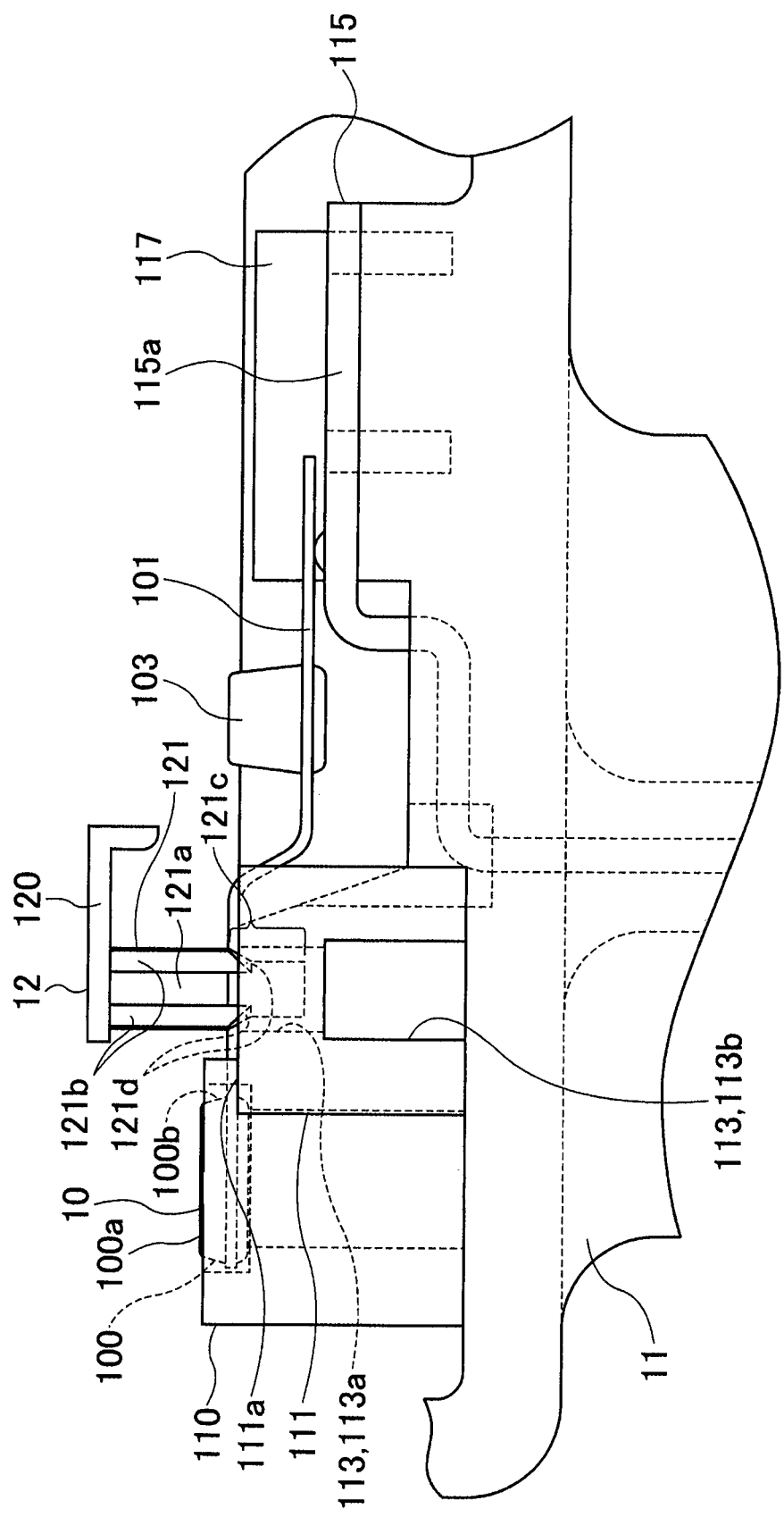
FIG. 14 is a sixth explanatory view used to describe the manner in which to affix the detection element to the base member.
Figure 15:
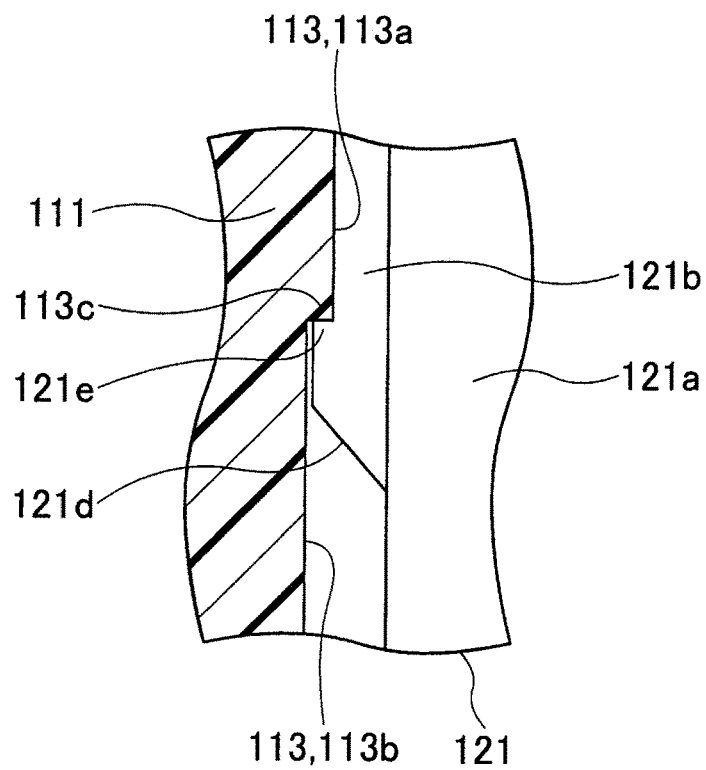
FIG. 15 is a partial enlarged view showing a periphery of a rib of one shaft portion.
Figure 16:
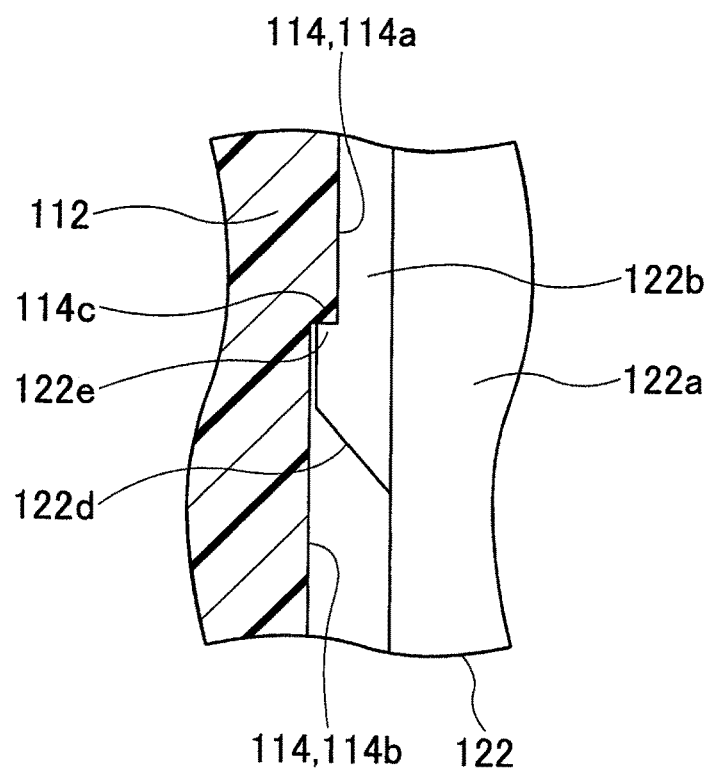
FIG. 16 is a partial enlarged view showing a periphery of a rib of the other shaft portion.

The third embodiment has described an example where a shaft portion is in a shape shown in FIG. 6 to FIG. 8. However, the present disclosure is not limited to the described example. A shaft portion may be in a shape shown in FIG. 19 to FIG. 21 or FIG. 30 to FIGS. 33.

As has been described, the detection device includes the detection element having the main body and the lead protruding from the main body, the base member to which the detection element is affixed, and an affixing member affixed to the base member and affixing the detection element to the base member by pressing the lead against the base member without pressing the main body against the base member.

Owing to the configuration as above, the affixing member affixes the detection element to the base member by pressing the lead against the base member without pressing the main body against the base member. Hence, a load applied to the main body can be reduced to a reasonable extent or to zero. After the detection element is mounted to the base member, the affixing member only has to be affixed to the base member to press the lead against the base member. That is, it is not necessary to move the detection element in a horizontal direction. Hence, the detection element can be affixed to the base member by a single-direction moving operation.

While the present disclosure has been described according to the embodiments above, it should be understood that the present disclosure is not limited to the embodiments above and structure thereof. The present disclosure includes various modifications and alterations within the equivalent scope. In addition, various combinations and embodiments, as well as other combinations further including one element alone and more or less than one element are also within the scope and the idea of the present disclosure.

The invention claimed is:

1. A detection device comprising:
  a detection element having a main body and a lead protruding from the main body;
  a base member having an affixing surface to which the detection element is affixed; and
  an affixing member affixed to the base member, the affixing member affixing the detection element to the affixing surface of the base member by pressing the lead against the affixing surface of the base member without pressing the main body against the base member, wherein
  the affixing member has a pressing portion, which presses the lead against the base member without pressing the main body against the base member, and a shaft portion, which protrudes from the pressing portion and is inserted into a hole portion of the base member, the shaft portion fitted to the hole portion at least partially with interference,
  when the shaft portion is inserted into the hole portion until the pressing portion makes contact with a surface of the base member, the shaft portion and the hole portion define a clearance portion along an entire circumference between an outer peripheral surface of the shaft portion at an end on the side of the pressing portion and an inner peripheral surface of the hole portion at an end on the side of the pressing portion, and
  the inner peripheral surface of the hole portion at the end on the side of the pressing portion is spaced from the outer peripheral surface of the shaft portion at the end on the side of the pressing portion toward an opposite side to a shaft center side.

2. The detection device according to claim 1, wherein:
  the pressing portion presses a predetermined region of the lead, which is close to the main body, against the base member.

3. The detection device according to claim 1, wherein:
  the shaft portion has a column portion, which protrudes from the pressing portion, and a plurality of ribs, which protrudes from an outer peripheral surface of the column portion to an opposite side to a shaft center side and extends in an axial direction of the column portion, the ribs fitted to the hole portion with interference at least partially in the axial direction at tip ends, which protrude to the opposite side to the shaft center side.

4. The detection device according to claim 1, wherein:
the hole portion has an interference fit portion, which is provided on an inserted side of the shaft portion and is fitted to the shaft portion with interference, and a clearance fit portion, which is adjacent to the interference fit portion on an opposite side to the inserted side of the shaft portion and is fitted to the shaft portion with clearance.

5. The detection device according to claim 1, wherein:
the shaft portion has a convergent portion provided to a tip end portion and tapered toward the tip end.

6. The detection device according to claim 1, wherein:
the outer peripheral surface of the shaft portion at the end on the side of the pressing portion is spaced from the inner peripheral surface of the hole portion at the end on the side of the pressing portion toward a shaft center side.

7. The detection device according to claim 1, wherein:
the hole portion has an interference fit portion and a large diameter portion,
the shaft portion is fitted to the interference fit portion with interference,
the large diameter portion has an inner diameter that is larger than an outer diameter of the shaft portion, and
the large diameter portion and the shaft portion define the clearance portion.

8. A detection device comprising:
a detection element having a main body and a lead protruding from the main body;
a base member to which the detection element is affixed; and
an affixing member affixed to the base member, the affixing member covering a part of the lead without covering the main body, the affixing member affixing the detection element to the base member by pressing the lead against the base member without pressing the main body against the base member, wherein
the affixing member has a pressing portion, which presses the lead against the base member without pressing the main body against the base member, and a shaft portion, which protrudes from the pressing portion and is inserted into a hole portion of the base member, the shaft portion fitted to the hole portion at least partially with interference,
when the shaft portion is inserted into the hole portion until the pressing portion makes contact with a surface of the base member, the shaft portion and the hole portion define a clearance portion along an entire circumference between an outer peripheral surface of the shaft portion at an end on the side of the pressing portion and an inner peripheral surface of the hole portion at an end on the side of the pressing portion, and
the inner peripheral surface of the hole portion at the end on the side of the pressing portion is spaced from the outer peripheral surface of the shaft portion at the end on the side of the pressing portion toward an opposite side to a shaft center side.

9. The detection device according to claim 8, wherein:
the hole portion has an interference fit portion and a large diameter portion,
the shaft portion is fitted to the interference fit portion with interference,
the large diameter portion has an inner diameter that is larger than an outer diameter of the shaft portion, and
the large diameter portion and the shaft portion define the clearance portion.

* * * * *